(12) United States Patent
Haga et al.

(10) Patent No.: US 6,719,658 B2
(45) Date of Patent: Apr. 13, 2004

(54) SUPPORT STRUCTURE FOR PLANET GEAR IN SIMPLE PLANETARY GEAR MECHANISM AND METHOD FOR MANUFACTURING THE MECHANISM

(75) Inventors: Takashi Haga, Ohbu (JP); Sueo Fukaya, Ohbu (JP); Takashi Hatanaka, Ohbu (JP)

(73) Assignee: Sumitomo Heavy Industries, Ltd., Tokyo (JP)

( * ) Notice: Subject to any disclaimer, the term of this patent is extended or adjusted under 35 U.S.C. 154(b) by 0 days.

(21) Appl. No.: 10/024,331

(22) Filed: Dec. 21, 2001

(65) Prior Publication Data

US 2002/0091030 A1 Jul. 11, 2002

(30) Foreign Application Priority Data

Dec. 21, 2000 (JP) .......................... 2000-389226
Jan. 9, 2001 (JP) .......................... 2001-1841

(51) Int. Cl.[7] .......................... F16H 23/00; F16H 3/70
(52) U.S. Cl. .......................... 475/163; 475/165; 475/170
(58) Field of Search .......................... 475/163, 165, 475/166, 169, 170, 172

(56) References Cited

U.S. PATENT DOCUMENTS

| | | | | |
|---|---|---|---|---|
| 4,014,224 A | * | 3/1977 | Pitts | 475/176 |
| 4,271,726 A | * | 6/1981 | Ryffel | 418/61.3 |
| 4,483,055 A | * | 11/1984 | Sekimoto et al. | 29/893.32 |
| 4,648,295 A | * | 3/1987 | Ley et al. | 82/18 |
| 4,656,891 A | * | 4/1987 | Durand | 475/179 |
| 4,896,567 A | * | 1/1990 | Zhou | 475/170 |
| 5,472,384 A | * | 12/1995 | Haga | 475/162 |
| 5,616,095 A | * | 4/1997 | Pruitt | 475/178 |
| 6,440,030 B1 | * | 8/2002 | Minegishi et al. | 475/178 |

FOREIGN PATENT DOCUMENTS

| | | | | |
|---|---|---|---|---|
| GB | 2195002 A | * | 3/1988 | F16H/57/12 |
| JP | 59147142 A | * | 8/1984 | F16H/3/48 |
| JP | 2001108040 A | * | 4/2001 | F16H/13/08 |
| JP | 2001165259 A | * | 6/2001 | F16H/13/08 |

OTHER PUBLICATIONS

Patent Abstract of Japanese Patent Application Publication No. JP63006248, dated Jan. 12, 1988.
Patent Abstracts of Japan for Japanese Patent Application Publication No. 05-240315 dated Sep. 17, 1993.
Patent Abstracts of Japan for Japanese Patent Application Publication No. 08-061438 dated Mar. 8, 1996.

* cited by examiner

Primary Examiner—Tisha D. Lewis
(74) Attorney, Agent, or Firm—Squire, Sanders & Dempsey L.L.P.

(57) ABSTRACT

A simple planetary gear mechanism is provided with an automatic alignment function to support the planet gear to obtain a speed reducer having reduced backlash by a simple method. A planet gear is supported by a carrier pin that is in turn supported by a carrier. The carrier pin includes a crank portion that is eccentric by "e" relative to the axis center of the carrier pin with the eccentric angle being made variable. The planet gear is supported rotatably about the axis center of the crank portion. Consequently, with the eccentric angle being made variable, the axis center of the planet gear is automatically aligned in the radial direction upon assembly of each gear, thereby making it possible to minimize backlash only by incorporating a sun gear having a proper dimension.

16 Claims, 13 Drawing Sheets

(b) TOOTH SHAPE AT MACHINING TOLERANCE Max ($\sigma Wi$)

(a) THEORETICAL TOOTH SHAPE (TOOTH SHAPE AT MACHINING TOLERANCE Min (=0))

TOTAL BACKLASH NBL (NORMAL DIRECTION)

(c) THEORETICAL TOOTH SHAPE (e) TOOTH SHAPE AT MACHINING TOLERANCE Max ($\sigma Wp$)

(d) TOOTH SHAPE AT MACHINING TOLERANCE Min (=0) (TOOTH SHAPE GIVEN BY FUNDAMENTAL BACKLASH ($\sigma Bp$))

SUPPORT STRUCTURE FOR PLANET GEAR IN SIMPLE PLANETARY GEAR MECHANISM AND METHOD FOR MANUFACTURING THE MECHANISM

BACKGROUND OF THE INVENTION

1. Field of the Invention

The present invention relates to a support structure for a planet gear in a simple planetary gear mechanism.

2. Description of the Related Art

The simple planetary gear mechanism comprises a sun gear; a planet gear which is supported by a carrier pin that is in turn supported by a carrier and which circumscribes the sun gear; and an internal gear in which the planet gear is inscribed. The simple planetary gear mechanism is compact, capable of providing a reduction ratio, and is adapted to easily change the reduction ratio (or the speed increasing ratio) by changing the arrangement and the input and output of each component. Thus, the simple planetary gear mechanism is widely used in various applications.

In recent years, on the other hand, production lines in factories have increased in complexity to manufacture many items in the same line. Accordingly, the entire line is not powered with a single power source as in the past but a special motor with a speed reducer is placed at individual portions of the line to cope with product diversification as well as to increase the efficiency of production. In this context, attention has been given to the simple planetary gear mechanism, as a type of a speed reducer coupled to the motor, which can be made compact.

However, the presence of backlash in each gear has turned into problems in such applications as the robot arm that requires forward and reverse rotations repeatedly and precise positioning of the arm at the predetermined absolute positions. That is, there exists backlash in the gear engagement in an unavoidable manner. With an excessive backlash, such a problem may arise that a command for reverse rotation cannot be immediately reflected on the reverse rotation of an input member (e.g., a carrier) even when the sun gear has already started its reverse rotation. This may also cause the arm to be out of alignment with its stopping positions. Accordingly, for a speed reducer of this type, the reduction of backlash has been a big problem to be tackled. The most basic method for reducing backlash has been actually practiced in many fields. According to the method, a plurality of gears are prepared first which have dimensions slightly different from each other, and then a gear is selected which engages another with the least gap upon assembly. In general, since many planet gears are employed in a speed reducer and therefore not selected preferably by try and error, internal and sun gears are to be selected.

However, there is a problem in this method that requires a large quantity of stocks and significantly reduces the efficiency of assembly, thereby easily resulting in an increase in cost. That is, for the simple planetary gear mechanism, there is another problem of variations in support position of the carrier pin relative to the carrier in addition to variations in dimension of each gear (i.e., the sun gear, the planet gear, and the internal gear). Accordingly, for example, suppose that the planet gear is given a dimension smaller than its standard dimension. In this case, to obtain proper backlash by the aforementioned method, it is necessary to incorporate a sun gear having a dimension greater than its standard dimension and an internal gear having a dimension less than its standard dimension.

Furthermore, suppose that each gear has successfully engaged another with no backlash at a certain position. Even in this case, when an attempt is made to actually rotate the gears, the gears may interfere with another at other position (due to the reduced backlash) to significantly increase the resistance to rotation. This has required a try and error attempt involving tremendous time and costs in order to provide the gears with the minimized backlash for smooth rotation at any time and positions.

In this context, there have been suggested several techniques for reducing the backlash not by try and error but by a simpler method in which some thought is put into the structure of the mechanism.

Japanese Patent Laid-Open Publication No. Sho 63-6248 suggested the following method for realizing reduced backlash. According to this method, in a simple planetary gear mechanism comprising four planet gears, those facing to each other are paired and a carrier pin for one pair of planet gears is offset in the circumferential direction in a so-called scissors configuration.

Japanese Patent Laid-Open Publication No. Hei 052-40315 also suggested the following method for realizing reduced backlash. According to this method, in a simple planetary gear mechanism comprising four planet gears, those facing to each other are paired and a carrier pin for one pair of planet gears is offset in the axial direction. In addition to this, the internal gear is divided into two in the axial direction to the offset planet gears and then one side of the internal gear is twisted in the circumferential direction to form a scissors configuration. One of the carriers disposed on both sides provides an output of forward rotation and the other provides an output of reverse rotation.

Japanese Patent Laid-Open Publication No. Hei 08-61438 suggested a structure for providing reduced backlash, in which the internal gear of the simple planetary gear mechanism is formed of elastic material to provide a negative backlash caused by the engagement of the internal gear with the planet gear.

However, consider a method for reducing backlash such as by the structure disclosed in Japanese Patent Laid-Open Publication No. Sho 63-6248. This method makes it possible to positively reduce the backlash in both the forward and reverse rotations. However, the method presents a problem that the amount of transmitted torque is reduced by one-half because only two planet gears contribute to the transmission of drive at the time of forward and reverse rotations, respectively, even though the mechanism is provided with four planet gears. There is also another problem that this method has a low degree of flexibility in designing the mechanism. That is, to maintain the torque capacities of forward and reverse rotations at the same level, it is necessary to assign the same number of planet gears to each rotation. This restricts the total number of planet gears to four in practice.

In this connection, it is well known that the so-called three-point support is better than the four-point support from the viewpoint of absorbing (or permitting) the dimensional or assembling error of each gear. However, this technique employs the arrangement in which the planet gears facing to each other are paired to adjust the backlash. This arrangement also raises a problem that it is not possible to employ a structure comprising only three planet gears, the structure corresponding to the three-point support.

Similarly, consider a method for reducing backlash such as by the structure disclosed in Japanese Patent Laid-Open Publication No. Hei 05-240315. This method also presents a problem that drive can be transmitted only by two of the four planet gears and therefore the transmission torque capacity cannot be maintained at high levels. The method raises another problem that it is not possible to employ a structure with the three-point support.

In addition, consider a method for reducing backlash such as by the structure disclosed in Japanese Patent Laid-Open Publication No. Hei 08-61438. This method provides an advantage of allowing all the planet gears to contribute to both the forward and reverse rotations. Nevertheless, the method requires the formation of the internal gear of an elastic material, thus providing bad machinability and making it difficult to maintain the strength at a sufficient level.

This method presents another problem of providing disadvantageous durability caused by the internal gear deformed each time the engagement position between the internal gear and each planet gear is displaced.

SUMMARY OF THE INVENTION

The present invention was developed in view of these conventional problems. It is therefore the main object of the present invention to allow all planet gears to contribute to both forward and reverse rotations and implement assembly in the minimized backlash condition at any position of engagement through a simple procedure. It is also another object of the present invention to provide a related method for manufacturing the mechanism.

The present invention solves the aforementioned problems by employing the following support structure for a planet gear in a simple planetary gear mechanism. The mechanism includes a sun gear, a planet gear, supported by a carrier pin supported by a carrier, circumscribing the sun gear, and an internal gear inscribed by the planet gear. The mechanism is adapted such that the carrier pin is provided with a crank portion having an eccentric direction, eccentric with respect to an axis center of the carrier pin, the eccentric direction being radially variable. The mechanism is also adapted such that the planet gear is supported rotatably about an axis center of the crank portion, the axis center being radially variable.

According to the present invention, the carrier pin for supporting the planet gear is not of a simple cylindrical shape as in the prior art but provided with the crank portion having an eccentric direction, eccentric with respect to the axis center of the carrier pin, the eccentric direction (an eccentric angle α) being radially variable. More precisely, the eccentric angle α is "an angle formed between the tangential direction (aligned with an eccentric reference direction) of the axis center of carrier pin in the simple planetary gear mechanism and a straight line connecting between the axis center of the carrier pin and the axis center of the crank portion." A variation in the eccentric angle α causes the axis center of the crank portion to vary in the radial direction. The planet gear is supported rotatably about the axis center of the crank portion that is made variable in the radial direction.

Basically, backlash is "play" that is present between teeth of gears in the circumferential direction. This concept has lead to a technique for reducing the backlash by shifting the engaging teeth "in the circumferential direction" relative to each other, and this technique has been dominant for a long time. In contrast to this technique, the present invention is particularly characterized in that the axis center is made variable "in the radial direction."

This arrangement allows the axis center of the crank portion for actually rotatably supporting the planet gear (or the substantial center of rotation of the planet gear) to be set at the best balanced position in relation to the internal gear or the sun gear. This has made it possible to cope with a variety of manufacturing variations in an extremely flexible manner. With this arrangement, for example, it is possible to absorb the manufacturing error of each gear at a time including the displacement of the carrier pin of a planet gear by preparing only a plurality of sun gears having dimensions slightly different from each other and then simply selecting a sun gear having a proper dimension upon its assembly.

Among other things, it is made possible to allow all the planet gears to contribute to the transmission of drive both in the forward and reverse rotations. For example, since either an odd or even number of planet gears can be employed, it is also possible to provide an advantageous "three-point support structure" using three planet gears, as described later.

Incidentally, the present invention is adapted to adjust the support position of a planet gear in the radial direction. For example, when the planet gear is brought towards the internal gear in this arrangement, the sun gear will be provided with increased backlash in principle. For this reason, it is preferable to adjust the backlash on the side of the sun gear. However, the present invention does not always make it inevitable to "select and adjust" the gear having an expanded backlash for the purpose of assembly. On the contrary, the present invention can still provide a sufficient advantage even in a case where all gears are manufactured at their predetermined design dimensions and incorporated as they are.

That is, the axis center of a planet gear was usually fixed and the effect of an error in the position of the axis center had to be taken into account. Thus, for example, it could not be avoided to make the design dimension of the sun gear smaller and the design dimension of the internal gear larger. However, the present invention provides such a planet gear as has an automatic alignment function, thereby making an allowance for machining tolerances. This provides an advantage of reducing the tendency of the machining tolerance to have an adverse effect even when the design backlash is set at a smaller value.

Furthermore, the planet gear is positioned where the active and reactive forces against both the internal gear and the sun gear are kept in balance. This makes it possible to provide an effect of allowing for very smooth rotations even with the backlash minimized.

Incidentally, according to the present invention, no particular restrictions are imposed on how to specifically form the crank portion, but various arrangements can be employed.

For example, it is possible to form the crank portion of the carrier pin by providing an eccentric cam, capable of rotatably supporting the planet gear, integrated with the carrier pin in the direction of rotation, and by rotatably supporting the carrier pin by means of the carrier. For the "integration in the rotational direction", the carrier pin and the eccentric cam may be formed completely in one piece or a plurality of members may be combined together to be consequently integrated in the rotational direction. For the "rotatable support", a bearing or the like may be interposed between the planet gear and the carrier pin.

Furthermore, the eccentric cam capable of rotatably supporting the planet gear can be rotatably incorporated onto the outer circumference of the carrier pin to thereby form the crank portion of the carrier pin.

Incidentally, for example, it is preferable to employ three planet gears for a more rational application of the present invention.

This is because the planet gear needs to rotate, while rotating about its own axis, on an orbit that is limited to the inside of the internal gear and the outside of the sun gear. Thus, from the viewpoint of absorbing the dimensional and assembling errors of each gear, the arrangement comprising three planet gears, which corresponds to the so-called three-point support, is the most rational one.

According to the present invention, all the planet gears can contribute to the transmission of torque and it is not necessary to provide an even number of planet gears. Thus, from the viewpoints of the torque transmission capacity and the number of planet gears required to reduce backlash, it is possible to set the number of planet gears at "3" without any problem.

Incidentally, the eccentric reference direction of the crank portion of each of the carrier pins may be preferably directed towards the same side relative to a straight line connecting between the axis center of the simple planetary gear mechanism and the axis center of the carrier pin.

The present invention provides a planet gear configured such that the axis center of the carrier pin is eccentric with respect to the center of rotation of the planet gear, which may cause a moment (a radial force) to be produced for pushing or pulling the planet gear outwardly or inwardly. However, it has been found that an adverse effect exerted by this moment can be reduced in many cases by maintaining the eccentric reference direction of the carrier pin of all the planet gears to the same side upon assembly.

The "eccentric reference direction" means the direction in which the axis center of the crank portion is eccentric with respect to the axis center of the carrier pin, or a reference direction of eccentricity. More specifically, this direction is aligned (but not necessarily coincident perfectly) with the tangent of the carrier pin. Then, with respect to this eccentric reference direction, the crank portion is rocked about the axis center of the carrier pin, thereby making the axis center of the crank portion variable in the radial direction.

Now, consider the case where "the eccentric reference direction is directed to the same side with respect to the straight line connecting between the axis center of the simple planetary gear mechanism and the axis center of the carrier pin." As described above, this means that it takes place in an unified manner whether the axis center of the crank portion is eccentric towards the forward or reverse direction of rotation with respect to the axis center of the carrier pin.

Furthermore, concerning the occurrence of the moment, the difference in the moment between the forward and reverse directions of rotation should be reduced to an unnoticeable level. For this purpose, an even number of the planet gears may be provided intentionally. Then, one eccentric reference direction of the crank portion of adjacent carrier pins is alternately directed opposite to the other relative to the straight line connecting between the axis center of the simple planetary gear mechanism and the axis center of the carrier pin.

That is, the force that pushes or pulls the planet gear outwardly or inwardly is reversed at the time of forward and reverse rotations.

Therefore, to reduce the difference between the effects of the moment produced at the time of forward and reverse rotations, it is the most rational to assemble the planet gear such that the behavior at the time of the forward rotation is likely equal to that at the time of the reverse rotation.

Incidentally, it has been confirmed that these moments can be reduced to a negligible level in practice by putting some thought into design because the manufacturing errors of the gears and the support hole for the carrier pin are subtle and the range of the errors can be specified.

Incidentally, the most significant feature of the present invention is the automatic alignment function provided for the crank portion of the carrier pin. For example, this function provides an advantage that even during running, the relationship of torque (or radial torque) among the internal gear, the planet gear, and the sun gear can be kept in balance in real time. Suppose that the sun gear is incorporated in a floated condition (in which its axis center can vary in a subtle manner relative to the axis center of the speed reducer, e.g., in a coupled condition by means of splines or means described later). In this case, the radial torques of all the planet gears are kept in balance in real time. In particular, with three planet gears, the speed reducer can be operated theoretically with the radial torques of all the planet gears kept in balance at all times, which could be a great merit depending on its application.

However, on the other hand, this automatic alignment function involves radial moments produced during running as described above. For example, when used for applications that require rotations at high speeds, the speed reducer would be affected by subtle manufacturing variations and thus its smooth rotation and support may be obstructed.

In this context, it should be a good idea to configure the speed reducer such that the eccentric direction of the crank portion of the carrier pin can be fixed in order to intentionally disable this automatic alignment function, once the speed reducer has been completely assembled under optimum conditions.

According to the present invention, when the eccentric direction of the crank portion of the carrier pin has been fixed, the axis center of the crank portion under the fixed condition has the same configuration as that of a "typical" simple planetary gear mechanism corresponding to the conventional axis center of a carrier pin. In other words, this means that the adjustment of only one sun gear can easily realize the same configuration as that of a simple planetary gear mechanism which is optimized conventionally by selecting components having an optimum dimension by try and error.

As described above, since the planet gear can be provided with the automatic alignment function, the present invention can readily manufacture a simple planetary gear mechanism having a minimized backlash by the following method. That is, the method includes the steps of first incorporating the internal gear and the planet gear, selectively extracting a sun gear having a proper dimension from a plurality of sun gears having different dimensions, and then incorporating the extracted sun gear into the central portion of the already incorporated planet gears while the eccentric direction of the crank portion of the carrier pin is being adjusted.

Incidentally, in principle, the initial object of the present invention can be achieved superficially if the crank portion is adapted to be rockable with respect to the axis center of the carrier pin and thereby the axis center of the planet gear is variable in the radial direction.

However, it has been confirmed that various drawbacks could occur when the position of the axis center of the carrier pin is not properly set upon designing and manufacturing a planet gear speed reducer to which the present invention is actually applied.

For example, as described above, the present invention provides each planet gear configured such that the axis center of the carrier pin is eccentric with respect to the center of rotation of the planet gear, which may cause a moment (a radial force) to be produced for pushing or pulling the planet gear outwardly or inwardly. This moment obstructs the smooth rotation of the planet gear and causes loss of energy, therefore reducing efficiency and thereby causing unnecessary heat to be generated. It is thus desirable to reduce this moment to a minimum, however, it has been found that the magnitude of the moment depends largely on the position to which the axis center of the carrier pin is set.

This finding has made it possible to set the axis center of the carrier pin at the optimum position, thereby making it possible to minimize the surfacing of the potential drawbacks of the present invention (described later).

In addition, the concept of the present invention is almost applicable not only to the simple planetary gear mechanism but also to a simple planetary roller mechanism including a sun roller, a planet roller, a ring roller (corresponding the internal gear) and a carrier supporting the planet roller. Therefore, the present invention includes the concept of the simple planetary roller mechanism despite the wording "gear" in the accompanied claims without departing from the basic sprit of the claimed invention.

As described above, the present invention can provide an automatic alignment function for the planet gear (a planet roller), and this automatic alignment function serves to improve the smoothness during running irrespective of various dimensional or assembly errors. Furthermore, it is also possible to employ a simple method for selectively incorporating a sun gear (or a sun roller) having a proper dimension by making use of this automatic alignment function. This method makes it possible to provide a speed reducer which has a reduced backlash or which is prepressurized appropriately.

BRIEF DESCRIPTION OF THE DRAWINGS

The preferred embodiments will be described with reference to the drawings, wherein like embodiments have been noted throughout the figures with like reference numerals and wherein.

DETAILED DESCRIPTION OF THE PREFERRED EMBODIMENTS

Now, the present invention will be explained below in more detail with reference to the accompanying drawings in accordance with the embodiments.

Figure 1:
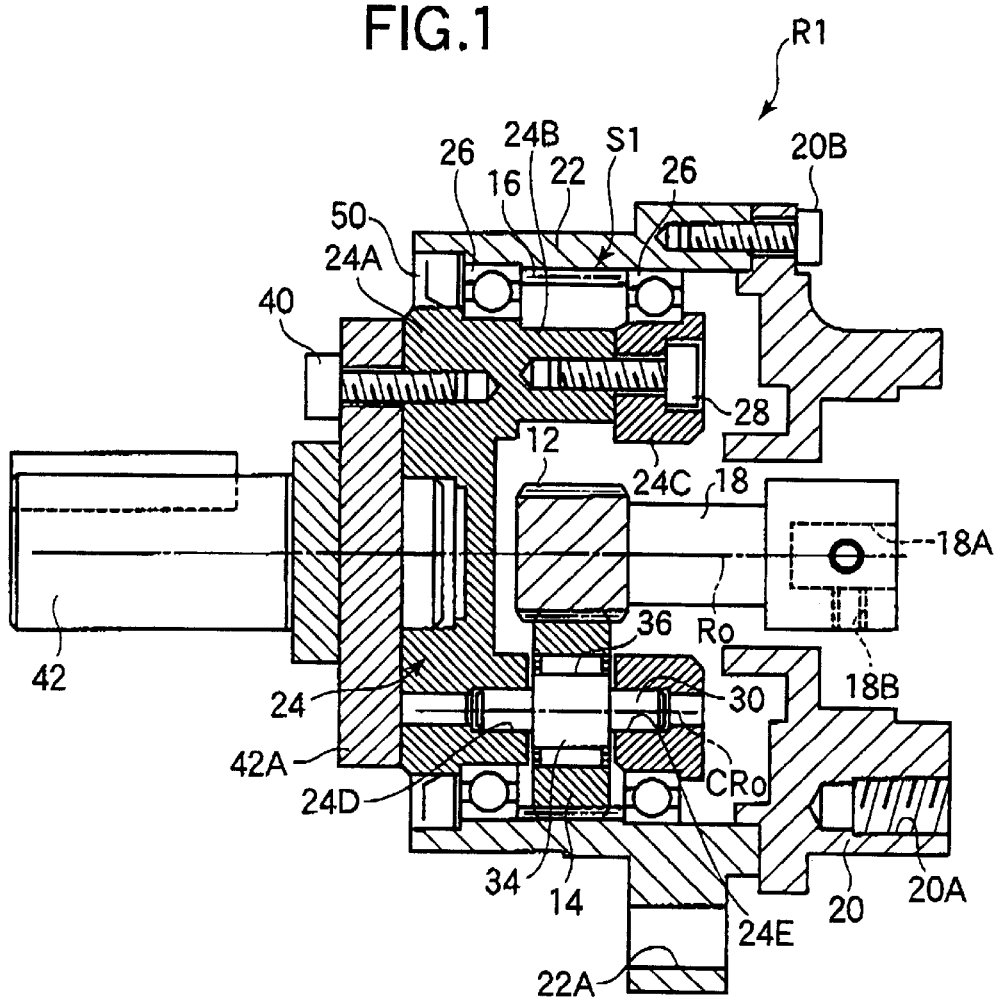
FIG. 1 is a schematic longitudinal sectional view illustrating a speed reducer to which an inscribed engagement planetary gear mechanism according to the present invention is applied.

FIG. 1 is a schematic longitudinal sectional view illustrating a simple planet gear reducer to which the present invention is applied.

A simple planet gear mechanism S1 of the simple planet gear speed reducer R1 includes a sun gear 12, three planet gears 14 circumscribing the sun gear 12, and an internal gear 16 in which the planet gears 14 are inscribed.

The aforementioned sun gear 12 is toothed directly on an input shaft 18. The input shaft 18 is provided with a recessed portion 18A into which the output shaft of a motor (both not shown) is inserted, and coupled to the output shaft with a tightening bolt (not shown) that is screwed into a screw portion 18B.

Incidentally, the motor is coupled to a joint cover 20 via a coupling bolt hole 20A, and the joint cover 20 is coupled to a casing 22 of the reducer R1 via a bolt 20B.

Furthermore, the planet gears 14 are rotatably supported via a carrier pin 30 that is held by a carrier 24. Incidentally, the configuration of the vicinity of the carrier pin 30 will be described later.

The carrier 24, rotatably supported by the casing 22 via a bearing 26, includes a thick disc-shaped main-body plate 24A, three columns 24B which are provided perpendicularly on the main-body plate 24A and each positioned in between two of the aforementioned three planet gears 14, and a cover plate 24C coupled via a bolt 28 to an end surface of the columns 24B.

The main-body plate 24A of the carrier 24 is coupled with a flange 42A that is integrated with an output shaft 42 via a bolt 40, and the rotation of the carrier 24 about its own axis is taken as the rotation of the output shaft 42.

The aforementioned internal gear 16 is integrated with the casing 22. The casing 22 is secured to an external fixing member (not shown) via a mount hole 22A.

Accordingly, the speed reducer R1 includes a simple planetary gear mechanism in which the sun gear is an input member, the internal gear is a stationary member, and the carrier is an output member.

Incidentally, reference number 50 designates a seal member in the figure.

Now, the support structure of the planet gears 14 is explained in detail.

Figure 2A:
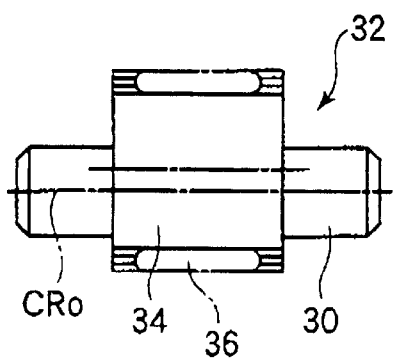
FIG. 2 shows a front and side view illustrating the structure of a carrier pin incorporated into the aforementioned speed reducer.
Figure 2B:
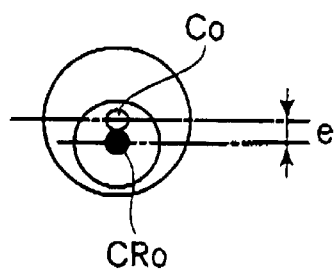
Figure 3:
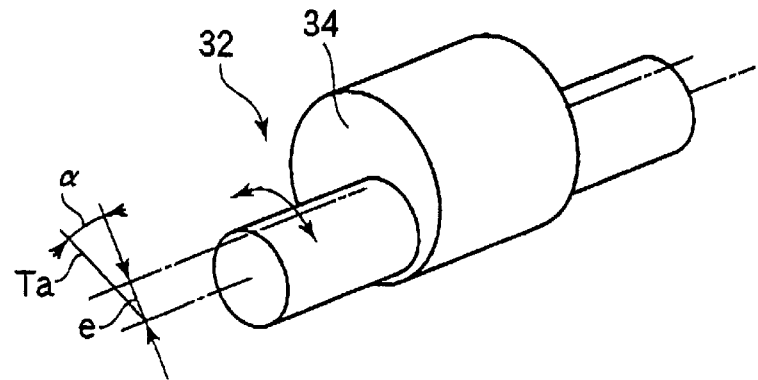
FIG. 3 is a perspective view illustrating the aforementioned carrier pin.
Figure 4:
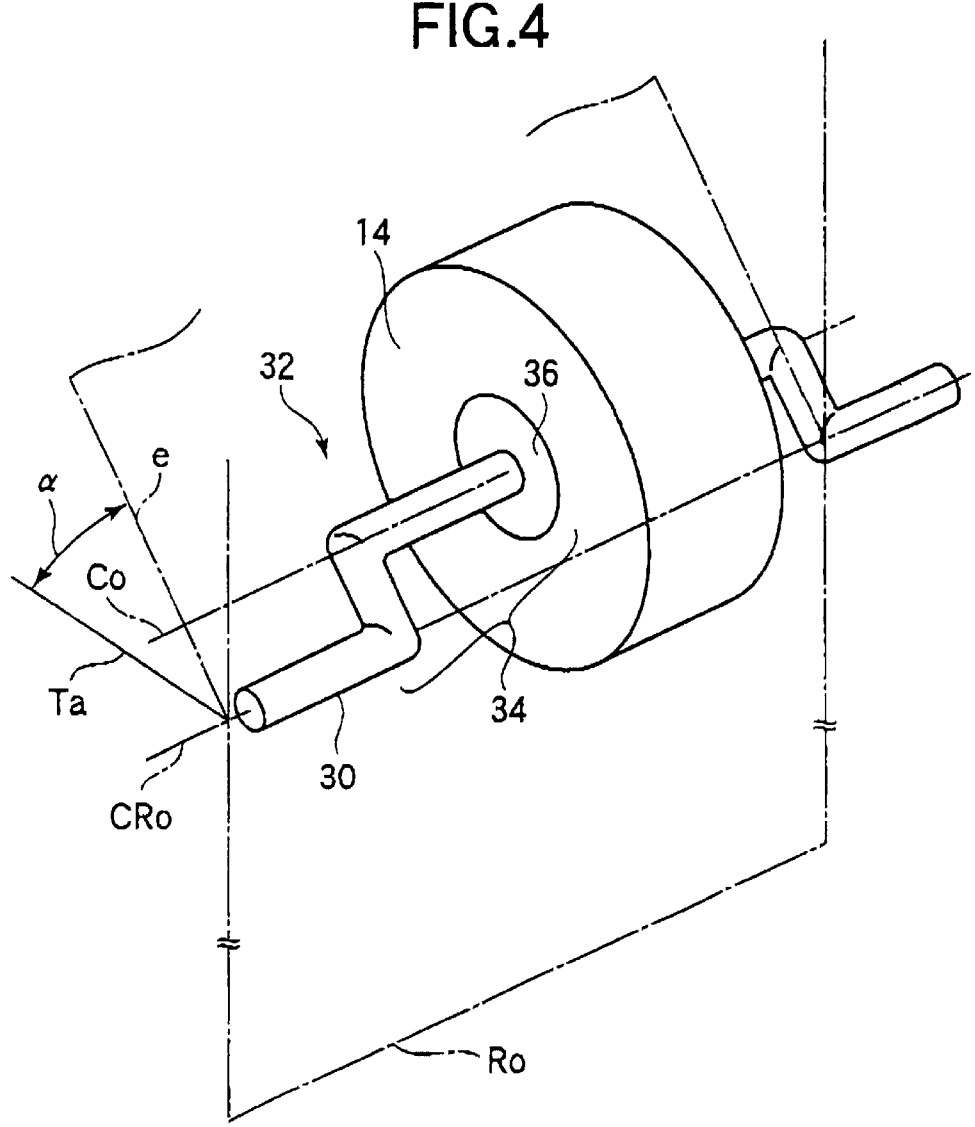
FIG. 4 is a conceptual perspective view illustrating the structure of the aforementioned carrier pin.

Referring to FIGS. 2 to 4 (where a conceptual view is shown in FIG. 4), the planet gears 14, three in number, are provided each supported by the carrier pin 30 that is in turn supported by the carrier 24. The carrier pin 30 is provided with a crank portion 32 which is eccentric with respect to the axis center CRo of the carrier pin 30 and which is disposed in a variable direction of eccentricity with respect to the carrier pin 30 (or at an eccentric angle $\alpha$). The "eccentric angle $\alpha$" means an angle at which an eccentric reference direction K forms with a line L connecting between the axis center CRo of the carrier pin 30 and the axis center Co of the crank portion 32. (The eccentric reference direction K basically means the direction in which the axis center of the crank portion is eccentric with respect to the axis center of the carrier pin, i.e., a reference direction of eccentricity: in this example, the eccentric reference direction K is in a tangential direction Ta determined by a method described later.) With reference to the eccentric reference direction Ta, the crank portion 32 is rocked by the eccentric angle $\alpha$ about the axis center CRo of the carrier pin 30, thereby making the axis center Co of the crank portion 32 variable in the radial direction.

The planet gears 14 are rotatably supported about the axis center Co of the crank portion 32.

More specifically, on the outer circumference of the carrier pin 30 is provided an eccentric cam 34 that is eccentric with respect to the axis center CRo of the carrier pin 30 by an amount of eccentricity e. The eccentric cam 34 rotatably supports, on its own outer circumference, the planet gears 14 (via a bearing 36). The eccentric cam 34 is integrated with the carrier pin 30 in the direction of rotation.

The carrier pin 30 itself is rotatably supported, at its both ends, with a hole 24D formed in the main-body plate 24A of the carrier 24 and a hole 24E formed in the cover plate 24C (see FIG. 1).

As shown in FIG. 4, this structure is conceptually the same as the following arrangement. That is, this arrangement is provided with the crank portion 32 which is eccentric with respect to the axis center CRo of the carrier pin 30 by the amount of eccentricity e and which is radially variable in the direction eccentric with respect to the carrier pin 30 (or at an eccentric angle $\alpha$). The arrangement is also adapted such that the planet gears 14 are rotatably supported about the axis center Co of the crank portion 32.

If it puts in another way: the carrier pin 30 supports the planet gear and synchronizes with the planet gear's orbital motion; the planet gear is assembled so that the axis center Co of the planet gear 14 is eccentric with respect to the axis center CRo of the carrier pin 30 by the amount of eccentricity e; furthermore, the axis center of the planet gear is radially variable with respect to the axis center Ro of the simple planetary gear mechanism.

Incidentally, the positional setting of the axis center CRo of the carrier pin 30 will be more specifically described later.

Figure 5:
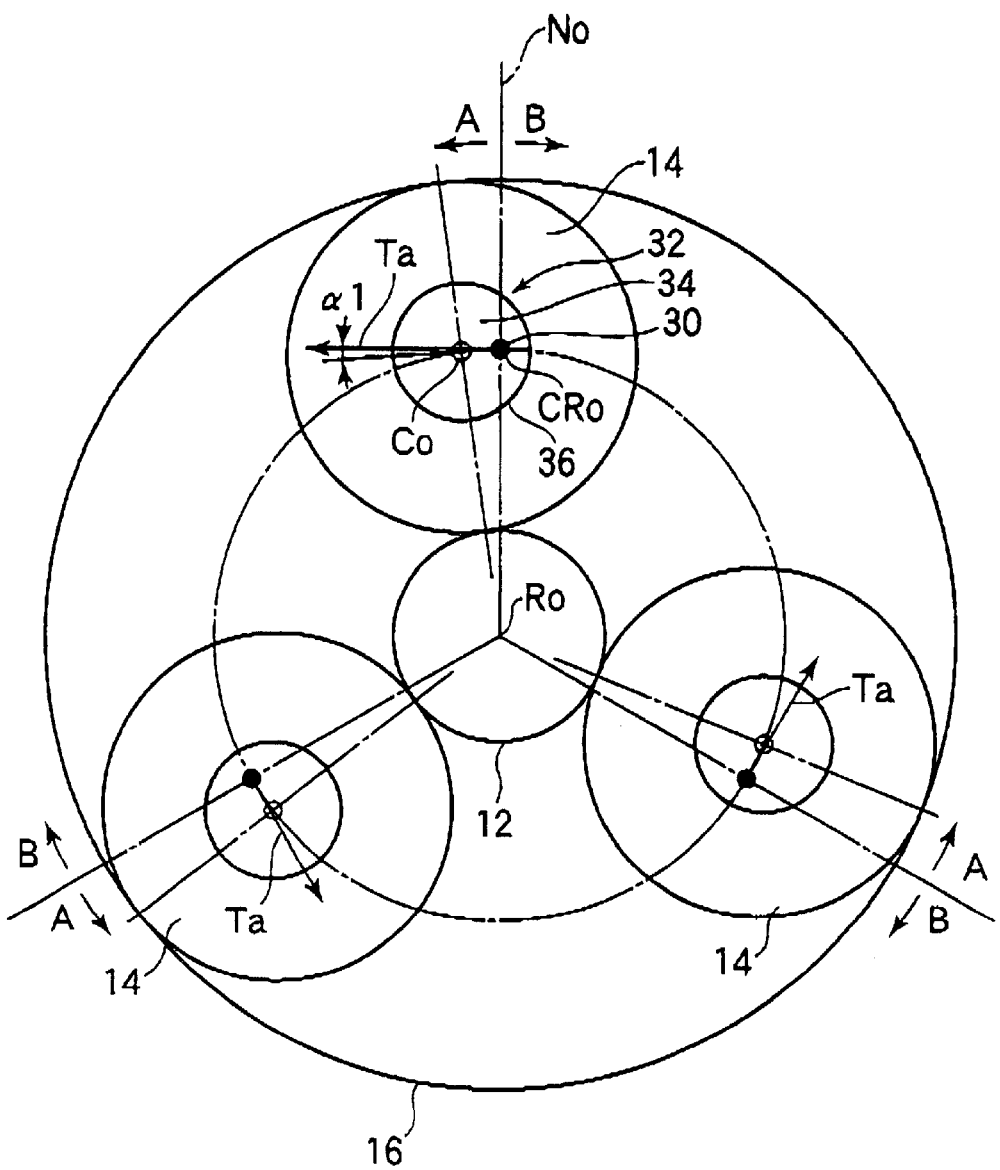
FIG. 5 is a diagram illustrating the crank portion of the carrier pin with a planet gear having a proper dimension being incorporated into an internal gear having a proper dimension in the aforementioned inscribed engagement planetary gear mechanism.
Figure 6:
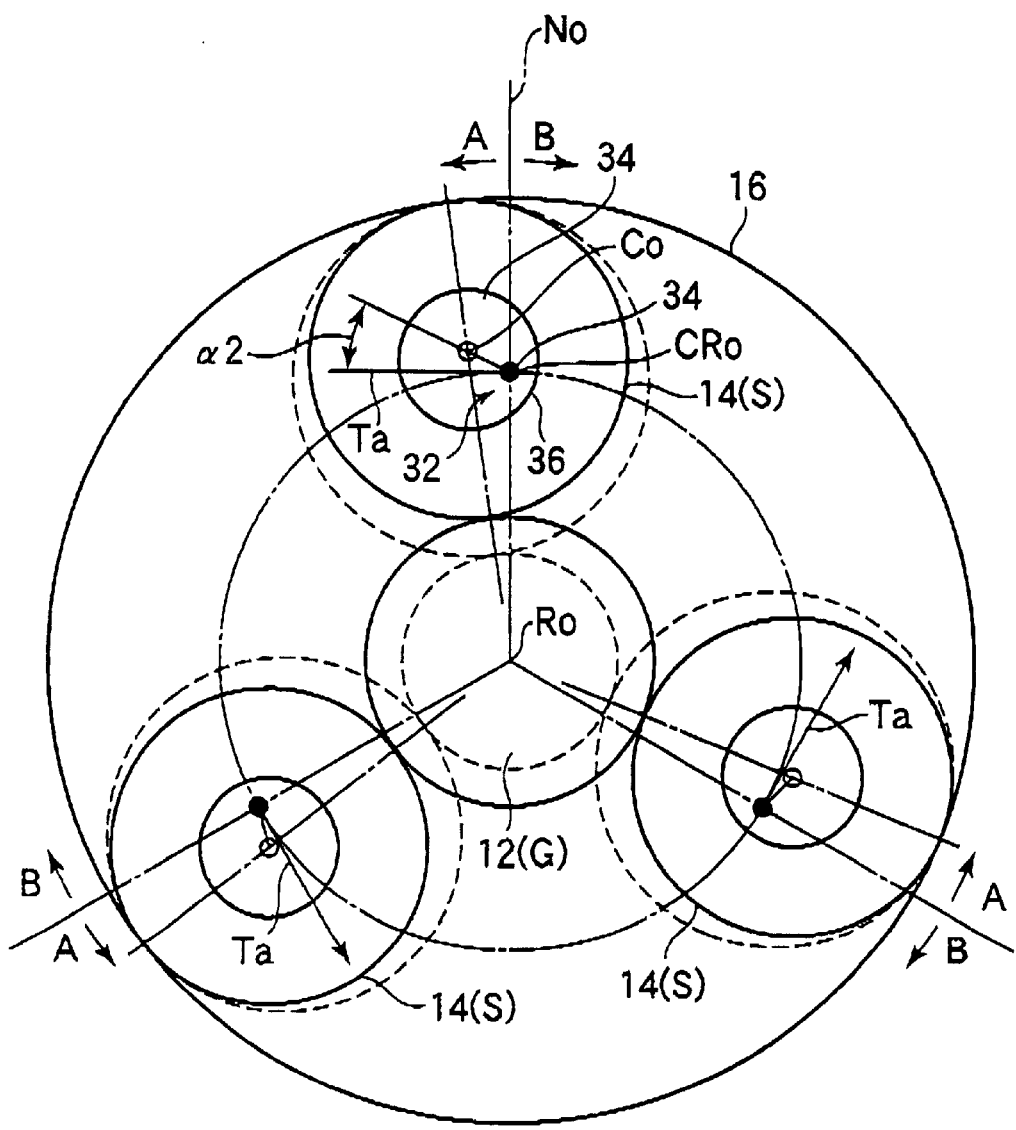
FIG. 6 is a diagram illustrating the crank portion of the carrier pin with a planet gear having a dimension smaller than its proper dimension being incorporated into an internal gear having a proper dimension in the aforementioned inscribed engagement planetary gear mechanism.
Figure 7:
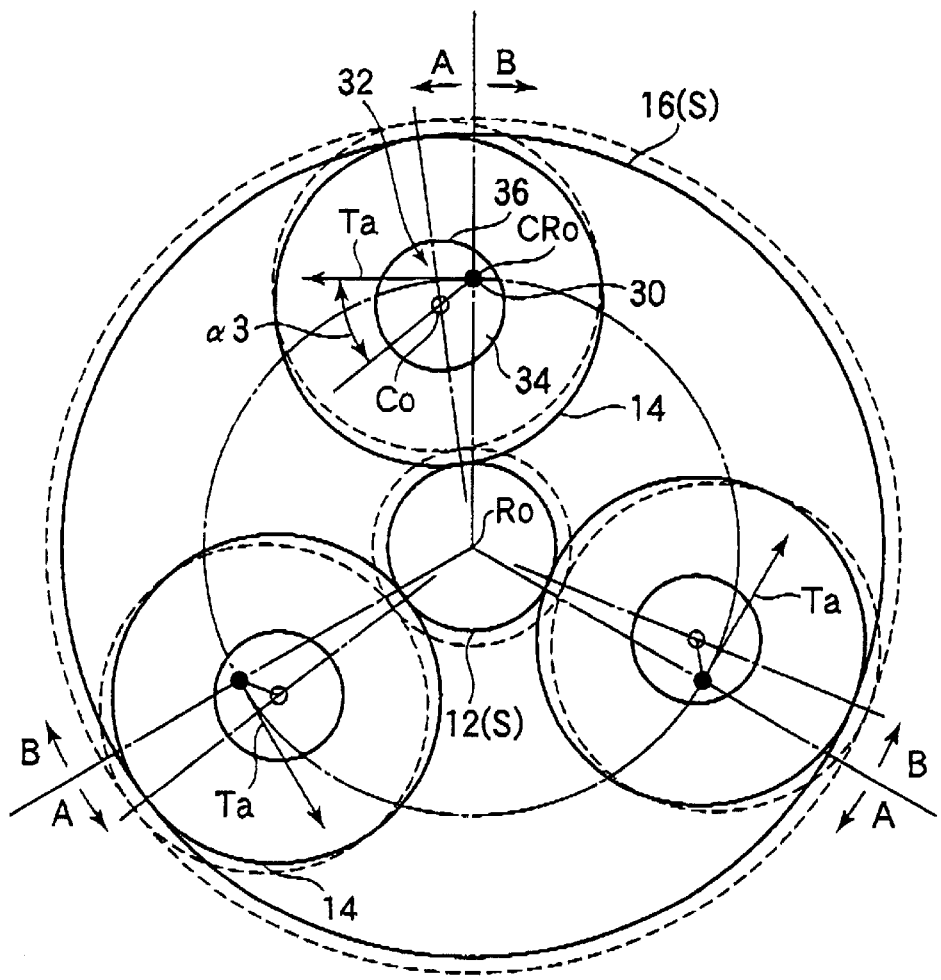
FIG. 7 is a diagram illustrating the crank portion of the carrier pin with a planet gear having a proper dimension being incorporated into an internal gear having a dimension smaller that its proper dimension in the aforementioned inscribed engagement planetary gear mechanism.

Now, referring to FIGS. 5 to 7, the action of the speed reducer R1 is explained below.

Now, suppose that the planet gears 14 have proper dimensions (more specifically, their base tangent lengths). In this case, as shown in FIG. 5, the crank portion 32 of the planet gears 14 is assembled at an eccentric angle $\alpha 1$ that is nearly equal to the eccentric reference direction Ta (or at an eccentric angle $\alpha=0$ degrees). Incidentally, at this stage, the eccentric reference direction Ta of the crank portion of each carrier pin 30 is placed on the same side—on side A in the example of FIG. 5—in the circumferential direction with respect to the straight line connecting between the axis center Ro of the simple planetary gear mechanism and the axis center CRo of the carrier pin 30 (or with respect to the normal No to the orbit of the carrier pin 30).

To provide proper backlash in this arrangement, a sun gear 12 having a properly selected base tangent length may be incorporated into the central portion surrounded by each of the planet gears 14. It provides a sufficient adjustment of balance among the gears of three types—the sun gear 12, the planet gears 14, and the internal gear 16—including the support position of the planet gears 14 to incorporate only the sun gear 12 having a properly selected base tangent length. Thus, this makes it possible to provide a speed reducer R1 having reduced backlash.

Incidentally, in this arrangement, the eccentric reference direction Ta of the crank portion of each carrier pin 30 is placed on the same side—on side A in the example shown in the figure. This is because the radial moment produced in each of the planet gears 14 can be aligned in the same direction (either in the outward direction towards the outer circumference or in the inward direction towards the inner circumference), thereby making it easy to cancel out the moments each other on the entire circumference.

On the other hand, for example, suppose that the planet gear 14(S) has a dimension (a base tangent length) smaller than its proper value. In this case, as shown in FIG. 6, the crank portion 32 of the carrier pin 30 is provided with a positive value $\alpha 2$ as its eccentric angle $\alpha$. That is, the axis center Co of the crank portion 32 is shifted in the radially increasing direction with respect to the eccentric reference direction Ta (at an eccentric angle $\alpha=0$ degrees). Incidentally, the eccentric direction of the crank portion 32 of each carrier pin 30 is also aligned in the same direction (or on side A in the example of FIG. 6) to entirely cancel out the moments each other.

To provide a proper backlash in this arrangement, a sun gear 12(G) having a base tangent length selected to be greater than the standard one can be incorporated into the central portion of each of the planet gears 14(S). It provides a sufficient adjustment of balance among the gears of three types including the support position (Co) of the planet gears 14(S) to incorporate only the sun gear 12(G) having a selected base tangent length greater than a standard base tangent length. Thus, this makes it possible to provide a speed reducer R1 having less backlash.

Incidentally, it is possible to consider in the same way in the case where the internal gear 16 has a dimension (or the size of the over-pin) greater than a standard value. It provides a sufficient adjustment of balance among the gears of three types to incorporate only the sun gear 12(G) having a selected base tangent length greater than a standard base tangent length. Thus, this makes it possible to provide a speed reducer R1 having less backlash.

Furthermore, for example, suppose that the internal gear 16(S) has a dimension smaller than its standard value. In this case, as shown in FIG. 7, the crank portion 32 of the carrier pin 30 is provided with a negative value α3 as its eccentric angle α. That is, the planet gear 14 is assembled being shifted towards the radially decreasing direction with respect to the eccentric reference direction Ta. Incidentally, the eccentric reference direction Ta of the crank portion 32 of each carrier pin 30 is also aligned in the same direction (or on side A in the example of FIG. 7). To provide a proper backlash in this arrangement, a sun gear 12(S) having a base tangent length selected to be less than the standard one can be incorporated into the central portion of each of the planet gears 14. It provides a sufficient adjustment of balance among the gears of three types including the support position (Co) of the planet gears 14 to incorporate only the sun gear 12(S) having a selected base tangent length less than a standard base tangent length. Thus, this makes it possible to provide a speed reducer R1 having less backlash.

This situation is also the same as the case where the planet gear 14 has a dimension greater than the standard value. Accordingly, it is possible to provide a speed reducer R1 having less backlash only by incorporating the sun gear 12(S) having a base tangent length selected to be less than the standard one.

As described above, it is possible to provide a speed reducer R1 having a proper backlash by adjusting only the finally assembled sun gear 12 even when any one of the planet gears 14 has a base tangent length either greater or less than the standard one.

Incidentally, since the planet gears 14 are machined at the same time in general, there is a low possibility of providing variations in dimension among the planet gears 14. However, when three of the planet gears 14 have variations in dimension, the backlash is optimized with reference to the largest planet gear. In this case, drive is transmitted by means of the largest planet gear 14 even immediately after the reverse rotation has been started. On the other hand, the other smaller planet gears cannot contribute to the transmission of drive (due to the presence of backlash) immediately after the reverse rotation has been started. However, the start of the reverse rotation causes the eccentric direction of the crank portion to be automatically adjusted to reduce the backlash. This allows the smaller planet gears to contribute to the transmission of drive thereafter (though all the planet gears contribute to the transmission equally). This is the biggest advantage of this embodiment over the prior-art scissor-type backlash reduction mechanism.

Incidentally, this embodiment is adapted such that the sun gear 12 is directly toothed on the input shaft 18 and the axis center So (=Ro) of the sun gear 12 is fixedly maintained. However, for example, the sun gear 12 may also be floated, such as splines or such that the axis center So can vary with respect to the axis center Ro of the speed reducer R1 in the embodiment described later. This makes it possible to manufacture a speed reducer R1 which provides a proper backlash to all the three planet gears, and allows all the three planet gears to equally contribute theoretically to the transmission of drive, even when the three planet gears 14 have manufacturing variations.

That is, in this embodiment, the planet gears 14 are limited to three in number. Thus, the finally incorporated sun gear 12 is supported by the three planet gears 14 as if it is supported "at three points in the three directions", thereby allowing the axis center So to be adjusted. Even with variations in dimension of the planet gears 14, this allows the axis center So of the sun gear 12 to variably follow the variations, thereby causing the aforementioned balance adjustment to be performed in each of the planet gears 14.

Irrespective of whether the internal gear 16 or any one of the planet gears 14 is greater or less than their standard ones or the planet gears 14 have variations in distances, it is thus made possible to provide a speed reducer R1 which automatically corrects the axis center So of the finally incorporated sun gear 12 and has a properly adjusted backlash at the engagement portion of each of the planet gears 14.

Incidentally, the aforementioned embodiment is adapted such that the carrier pin 30 is integrated with the eccentric cam 34 to rotatably support the carrier pin 30 at its both ends by the holes 24D, 24E of the carrier 24. However, according to the present invention, no particular restrictions are imposed on how the crank portion 32 of the carrier pin 30 is specifically configured.

Figure 8:
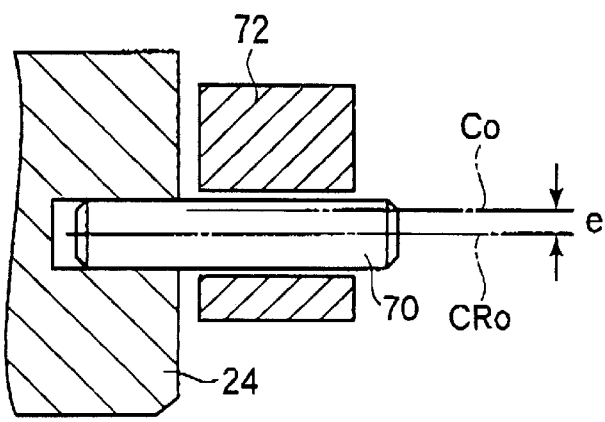
FIG. 8 is a partial cross-sectional view illustrating another example of the crank portion.

For example, as shown in FIG. 8, the same effect as described above can be obtained by rotatably incorporating an eccentric cam 72 onto a carrier pin 70 which is fixedly supported in the carrier 24.

In this case, it is not always necessary to support the carrier pin 70 at its both ends. Accordingly, the carrier 24 can also be used to support the carrier pin 70 at its one end. This makes it possible to eliminate the cover plate 24C, thereby reducing the cost and the axial length.

Incidentally, the aforementioned embodiment is adapted such that using the automatic alignment function of the present invention, a sun gear having a properly selected dimension is incorporated at the final stage of assembly, thereby reducing backlash. However, the present invention does not always require the selection of the dimension of the sun gear but may be adapted to incorporate a sun gear having a predetermined dimension without making any change to the dimension.

Since the axis center of a planet gear is fixed conventionally, it is inevitable to design the sun gear to have a dimension slightly smaller than its proper dimension. However, even in this case, the present invention is adapted such that the planet gear has the automatic alignment function and thereby provides an advantage in permitting a slightly larger dimension.

Furthermore, even with each part having a manufacturing or assembly error, it is possible to rotate the planet gear more smoothly.

Incidentally, suppose that a sun gear manufactured as designed is incorporated as it is (without selecting its dimension). In this case, the backlash of the entire speed reducer coincides with that of the portion having the least backlash of all planet gears.

Incidentally, as can be seen from the aforementioned embodiment, the present invention can make the most of its automatic alignment function when adapted to have three planet gears. However, naturally, the present invention is not limited to the particular number of planet gears. Therefore, it is also possible to provide four planet gears, allowing all the four to contribute to the transmission of drive even in this case.

Figure 9:
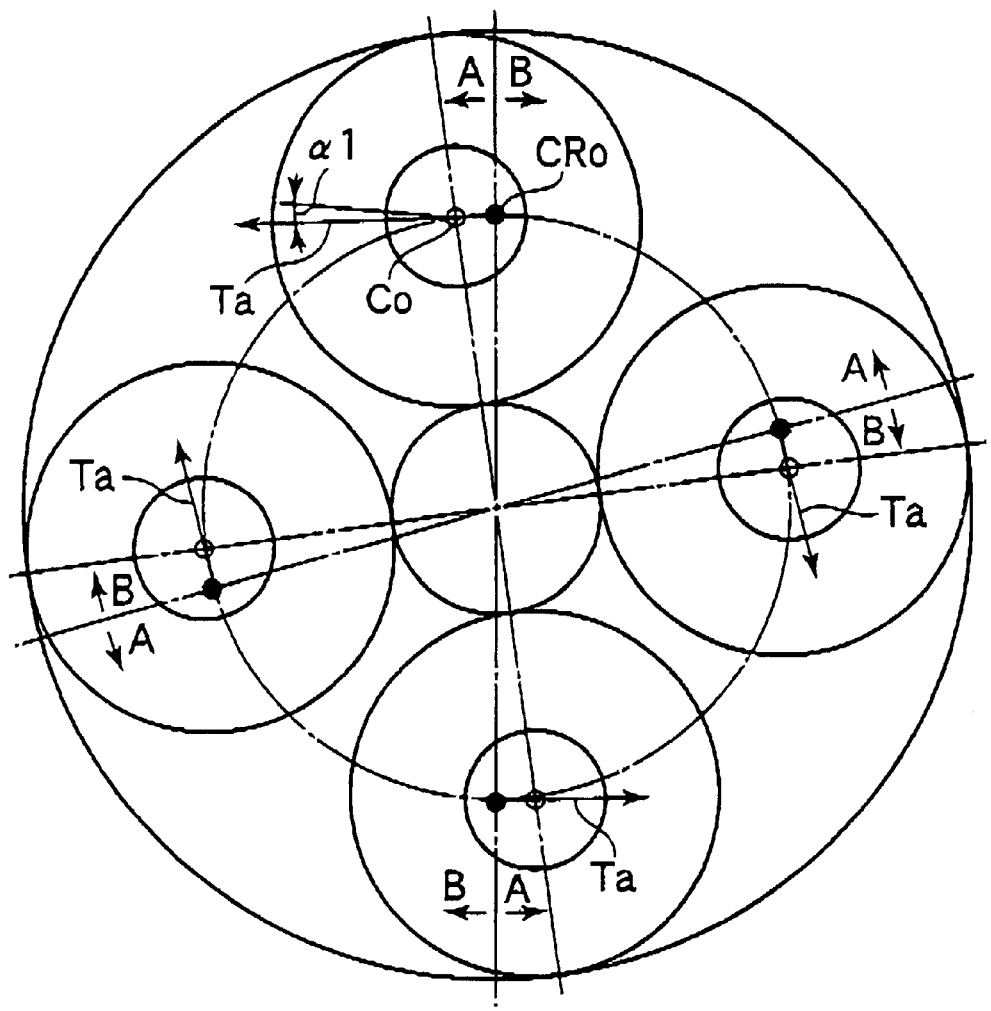
FIG. 9 is a diagram illustrating an arrangement having a preferable direction of eccentricity when four planet gears are incorporated.

Now, consider a case where four planet gears are employed as shown in FIG. 9. In this case, it is possible to adopt a structure in which those facing to each other are paired. Then, the eccentric reference direction Ta of the crank portion 32 of the carrier pin 30 in one pair of planet gears 14 and the eccentric reference direction Ta of the crank portion 32 of the carrier pin 30 in the other pair of planet gears 14 are directed opposite to each other. In the example shown in FIG. 9, the eccentric reference direction Ta of the carrier pin 30 of the planet gears 14 located on the upper and lower positions in the figure is directed towards side A, while the eccentric reference direction Ta of the carrier pin 30 of the planet gears 14 located on the left and right positions in the figure is directed towards side B.

The advantages of this structure are as follows.

That is, the present invention is adapted to have a crank structure which allows the substantial center of rotation of the planet gear 14 to be eccentric with respect to the axis center CRo of the carrier pin 30. This unavoidably causes moment to occur which pushes or pulls the carrier pin 30 outwardly or inwardly in the radial direction as long as the direction of eccentricity (or the eccentric angle α) of the crank portion 32 is not coincident with the eccentric reference direction Ta (or the tangential direction) with respect to the axis center CRo of the carrier pin 30.

This moment reverses the pushing and pulling motions at the time of the forward and reverse rotations, thereby possibly providing a subtle difference in its behavior at the time of forward and reverse rotations. In this context, those facing to each other are paired and the eccentric reference directions of one and the other pairs are directed towards either side A or B, opposite to each other, thereby making it possible to minimize the difference in behavior at the time of forward and reverse rotations (in terms of probability).

Incidentally, this effect can be obtained in the same manner irrespective of the number of the planet gears 14 as long as the planet gears 14 are even in number. In this case, the eccentric reference directions of adjacent planet gears 14 may be set opposite to each other.

Now, explained below is the structure for fixing the direction of eccentricity (or the eccentric angle α) of the crank portion 32 of the carrier pin 30.

As described above, the present invention is adapted such that the structure of the crank portion causes moment to occur to push or pull the carrier pin 30 outwardly or inwardly in the radial direction (as long as the eccentric direction α is not coincident with the eccentric reference direction Ta). In this context, for example, such a method is conceivable that allows the direction of eccentricity (or the eccentric angle α) to be fixed after a sun gear 12 having the most suitable dimension has been incorporated.

That is, the present invention makes it possible to provide a speed reducer having reduced backlash only by selecting the sun gear 12. Fixing the direction of eccentricity (or the eccentric angle α) of the crank portion 32 at this stage would provide the entirely the same arrangement as the "typical" simple planetary gear mechanism in which the axis center Co of the crank portion 32 corresponds seemingly to a conventional axis center of carrier pin.

The simple planetary gear mechanism is adapted to have the minimized backlash and never causes moment to occur which pushes or pulls the planet gears 14 outwardly or inwardly in the radial direction during operation.

Therefore, for example, with the simple planetary gear mechanism used for high speed operations, the direction of eccentricity of the crank portion 32 may be preferably fixed after having been adjusted once to its best condition. This would rather make it possible to maintain the good running condition for a long period.

Figure 10:
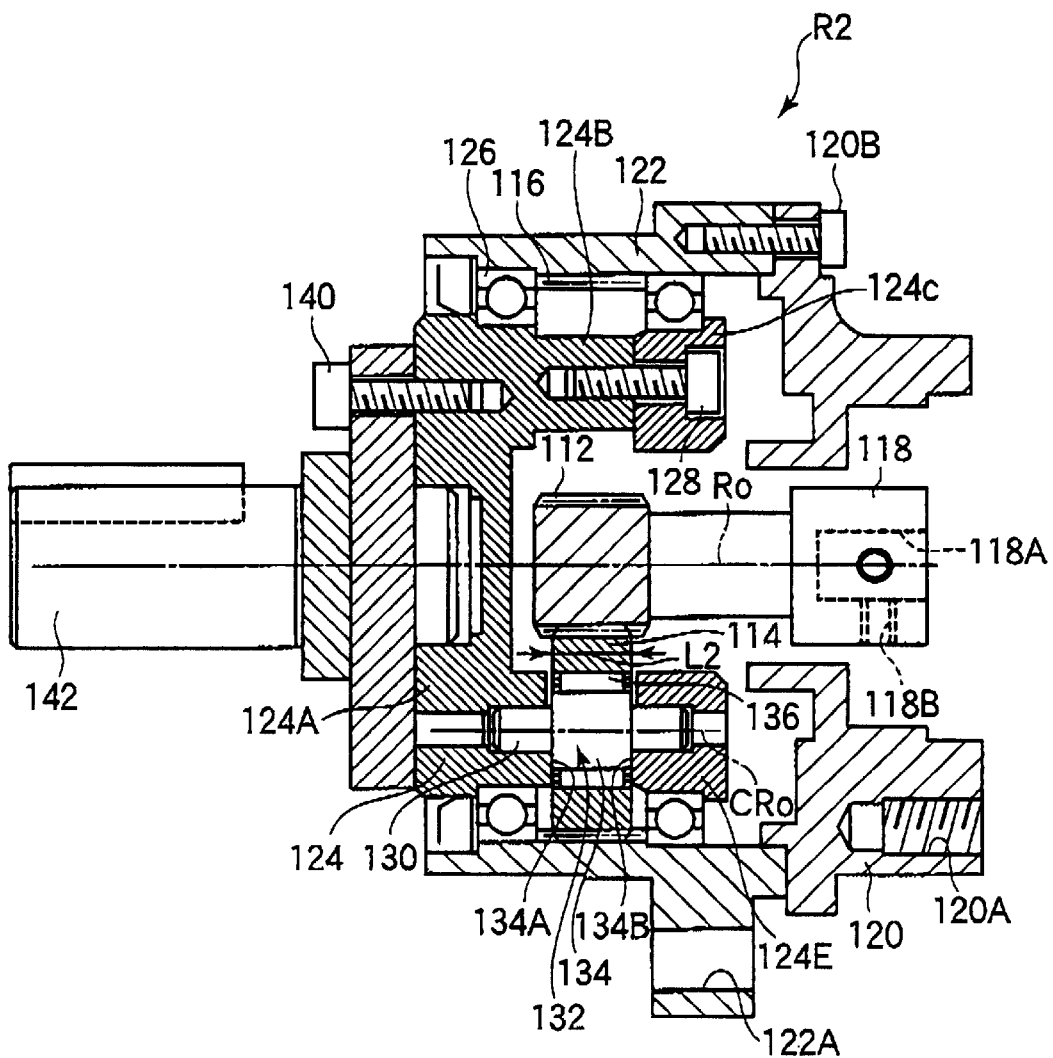
FIG. 10 is a longitudinal sectional view, corresponding to FIG. 1, illustrating a speed reducer which can fix the eccentric direction of the crank portion of the carrier pin.

The speed reducer R2 illustrated in FIG. 10 is adapted such that the direction of eccentricity of a crank portion 132 of a carrier pin 130 can be fixed in accordance with this design concept. That is, the speed reducer R2 illustrated in FIG. 10 is adapted such that the axial length L1 of an eccentric cam 134 is slightly longer than the axial length L2 of planet gears 114. In this arrangement, suppose that a bolt 128 is fastened after a sun gear 112 having a properly selected dimension has been incorporated. This causes both end portions 134A, 134B of the eccentric cam 134 are securely sandwiched between the end portion, located near the eccentric cam, of a main-body plate 124A of a carrier 124 and the end portion, located near the eccentric cam, of a cover plate 124C. Thus, the direction of eccentricity of the eccentric cam 134 is fixed, and thereafter the planet gears 114 will rotate about the axis center of the eccentric cam 134 (or the axis center Co of the crank portion 132) as the fixed center of rotation.

This method for fixing the direction of eccentricity (or the eccentric angle α) of the crank portion 132 after assembly never causes the moment to occur at the crank portion 132 during operations, thereby providing a merit that no difference in behavior will occur at the time of forward and reverse rotations. Therefore, the method is particularly effective if applied to a simple planetary gear mechanism which has an odd number of planet gears including three planet gears and in which it is structurally difficult to cancel out the moments each other.

Incidentally, in the figure, other components, configured in the same way as in the previous embodiment, are provided with such reference numbers as have the same two lower digits and will not repeatedly explained.

Now, referring to FIG. 11, a specific example is described below in which the present invention is applied a two-stage speed reducer with the sun gear being floated.

The simple planetary gear speed reducer R2 according to this specific example is formed in a two-stage type, which is provided with a simple planetary gear mechanism Se (the same as that of the aforementioned embodiment) and a simple planetary gear mechanism Sp disposed at the front stage of the simple planetary gear mechanism Se. The simple planetary gear mechanism Se includes the sun gear 12, the three planet gears 14 circumscribing the sun gear 12, and the internal gear 16 in which the planet gears 14 are inscribed. The simple planetary gear mechanism Sp includes a sun gear 72, three planet gears 74 circumscribing the sun gear 72, and an internal gear 76 in which the planet gears 74 are inscribed.

The sun gear 72 of the simple planetary gear mechanism Sp is integrally toothed on its input shaft 78. The input shaft 78 is provided with a recessed portion 78A into which the output shaft of a motor (both not shown) is inserted, and coupled to the output shaft with a tightening bolt (not shown) that is screwed into a screw portion 78B.

Incidentally, the motor is coupled to a joint cover 80 via a coupling bolt hole 80A, and the joint cover 80 is coupled to a joint casing 82 and the casing 22 via a bolt 80B.

The aforementioned internal gear 76 is integrated with the joint casing 82.

These components are configured basically in the same way as those equivalent in the previous embodiment.

Three planet gears 74 are employed on the entire circumference. However, each of the planet gears 74 is rotatably supported via a bearing 92 by means of a carrier pin 90 that is press-fitted into a carrier pin hole 84D of a carrier 84. The carrier pin 90 has no crank portion. That is, the axis center CRo of the carrier pin 90 is not eccentric but aligned with the center of rotation of the planet gears 74.

Incidentally, there is incorporated an annular axial plate 94 near the end surface of the carrier pin 90.

The carrier 84 acts also as the output shaft of the simple planetary gear mechanism Sp, and the input shaft 18 of the rear-stage simple planetary gear mechanism Se is directly press-fitted into the carrier 84.

Therefore, this speed reducer R2 includes two stages of simple planetary gear mechanisms in which drive is received by the sun gear to the stationary internal gear and then delivered from the carrier. The rear stage is a simple planetary gear mechanism having an eccentric structure according to the present invention.

Figure 11:
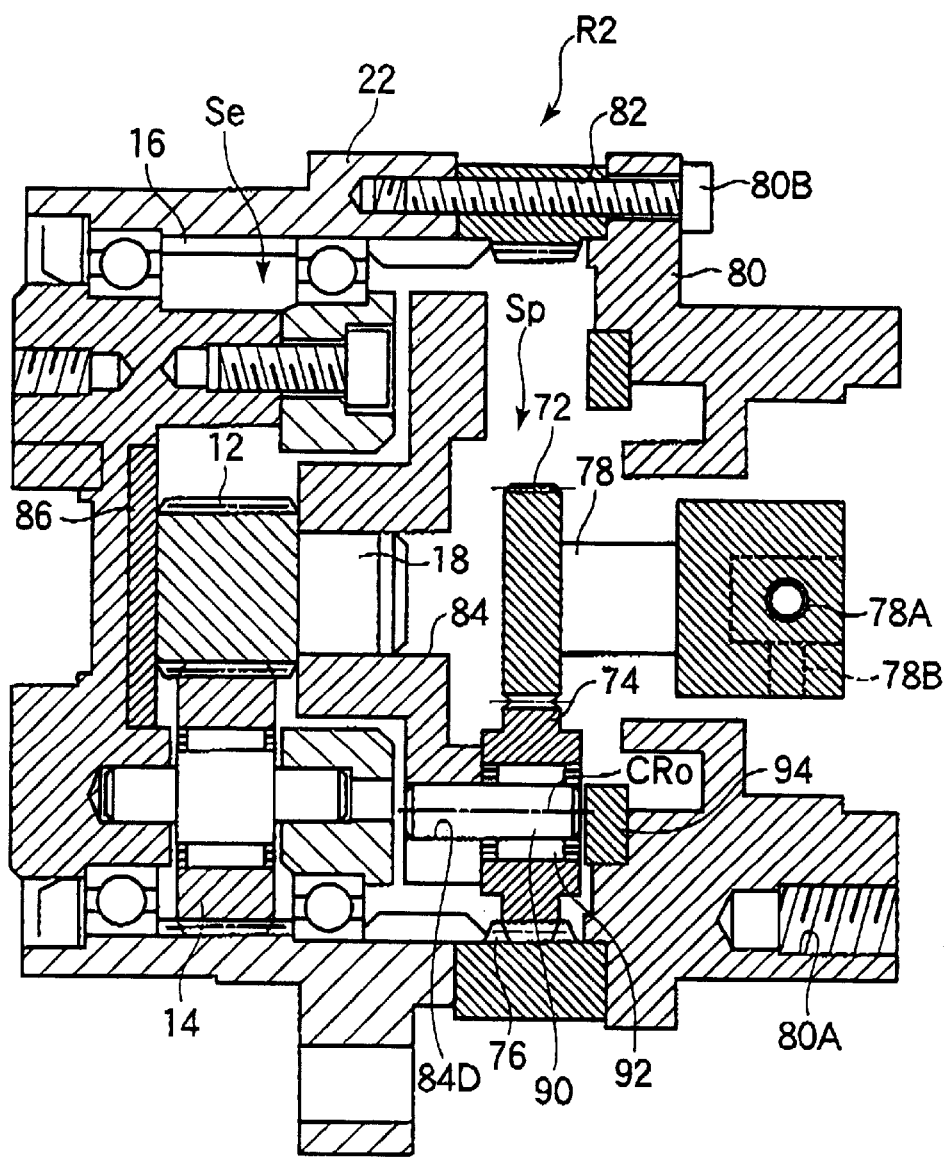
FIG. 11 is a longitudinal sectional view, corresponding to FIG. 1, illustrating a two-stage planet gear speed reducer to which the present invention is applied.

As can be seen clearly from FIG. 11, since the carrier pin 90 of the simple planetary gear mechanism Sp is press-fitted into the carrier 84, the carrier pin 90 and the carrier 84 can be assumed to be integrated with each other. Furthermore, the input shaft 18 of the simple planetary gear mechanism Se is press-fitted into the carrier 84, and can therefore be assumed to be integrally coupled to the carrier 84. Furthermore, the sun gear 12 is integrated with the input shaft 18. The sun gear 12 is provided with an axial plate 86, which restricts axial movement. After all, as described above, the speed reducer R2 is adapted such that a group of intermediate components comprising the carrier pin 90, the carrier 84, the input shaft 18, and sun gear 12 is integrally disposed in between the two axial plates 86, 94.

The sun gear 72, the planet gears 74, and the internal gear 76 of the simple planetary gear mechanism Sp serve as a type of a large bearing. Thus, shown in the figure, no special bearing is provided for the support. The rear-stage simple planetary gear mechanism Se also serves as a type of large bearing, so that no bearing is provided in this portion.

Consequently, previously known backlash or "play" existing in the front-stage simple planetary gear mechanism Sp allows the sun gear 12 of the rear-stage simple planetary gear mechanism Se to be kept slightly floated in the radial direction.

Incidentally, the backlash or "play" that exists in the same way as previously known in the front-stage simple planetary gear mechanism Sp has an effect that is reduced to a fraction of the reduction ratio due to the presence of the rear-stage simple planetary gear mechanism Se. The effect can therefore be almost negligible in practice.

On the other hand, the presence of the backlash allows the front-stage simple planetary gear mechanism Sp to rotate very smoothly even at comparatively high speeds. Furthermore, with the sun gear 12 of the rear-stage simple planetary gear mechanism Se being kept slightly floated in the radial direction, the planet gears 14 are automatically aligned. This makes it possible to rotate the planet gears 14 always under a uniform load condition without backlash. This automatic alignment is performed at a low rotational speed that has been already reduced through the front stage, thereby being accomplished very smoothly and positively.

That is, a conscious choice has been made in this embodiment to incorporate the conventional simple planetary gear mechanism into the front stage, thereby providing smooth rotation at high speeds in the front stage. Furthermore, this embodiment has made positive use of the presence of the backlash or play to support the rear-stage sun gear in a floating condition, thereby making the most of the intended function of the rear stage according to the present invention.

In this embodiment, it is also possible to employ the aforementioned various modifications to the present invention, thereby providing corresponding effects.

Now, it is explained below in detail how to set the position of the axis center CRo of the carrier pin 30.

As can be seen from the foregoing explanations, the present invention provides a planet gear configured such that the axis center CRo of the carrier pin 30 is eccentric with respect to the center Co of rotation of the planet gear 14, which may cause a moment (a radial force) to be produced for pushing or pulling the planet gear 14 outwardly or inwardly.

How this moment occurs depends largely on the position of the axis center CRo of the carrier pin 30.

Figure 12:
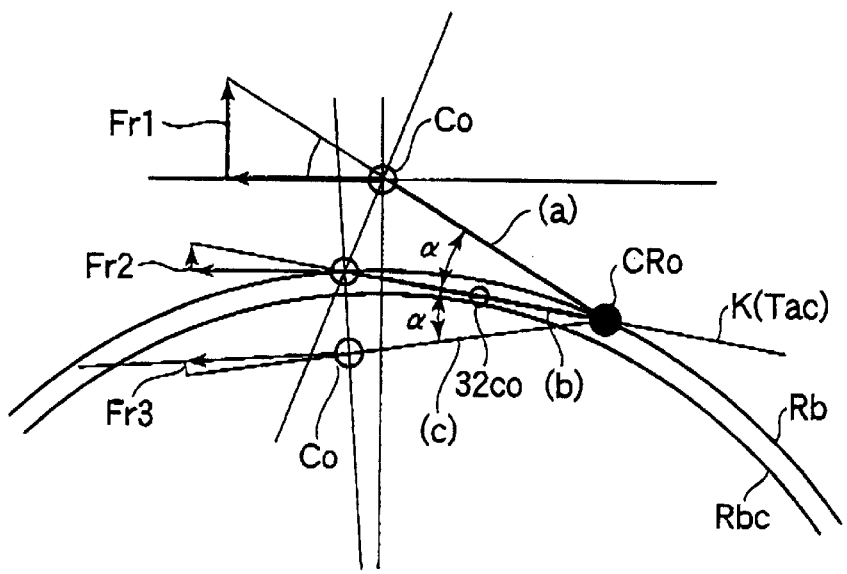
FIG. 12 is a diagram illustrating a setting arrangement of the axis center of a carrier pin (having a potential drawback) which has been devised in the course of developing the present invention.

Suppose that there are some basic concepts concerning the axis center CRo of the carrier pin 30. As shown in FIG. 12, one of the most basic concepts may be conceivably "to place the axis center CRo of the carrier pin 30 on a circle (or a reference circle) Rb that passes through the axis center Co of the planet gear 14 (which is expected in its design)". (In this case, both axis centers Co and CRo are placed at the equal distances from the axis center Ro of the speed reducer.)

In other words, this concept means that "the eccentric reference direction K coincides with the tangential direction Ta of a circle Rbc that passes through the center of the crank portion 32 (or the middle point 32co between the axis center CRo of the carrier pin 30 and the axis center Co of the crank portion). This concept is a natural one in a sense.

However, consider the case where the axis center CRo of the carrier pin 30 is placed on the reference circle Rb as described above. In this case, as obviously seen from FIG. 12, a moment (Fr2) shown by (b) of FIG. 12 is produced even when the planet gear 14 has been formed at a value corresponding generally to the middle point of its machining tolerance. In addition to this, as shown by (a) of FIG. 12, a significantly larger moment (Fr1) is produced when the planet gear 14 has been formed at a value slightly smaller than the middle point, and as a result, the axis center Co of the planet gear 14 is shifted further outwardly in the radial direction. This situation means that even when the planet gear 14 has been formed within its machining tolerance, a moment is produced outwardly in the radial direction almost in all conditions of assembly, and the moment still has a fairly large absolute value.

This means that it is not always preferable to place the axis center CRo of the carrier pin 30 on the same circle (or the reference circle) Rb as the axis center Co of the planet gear 14 is originally placed.

Figure 13:
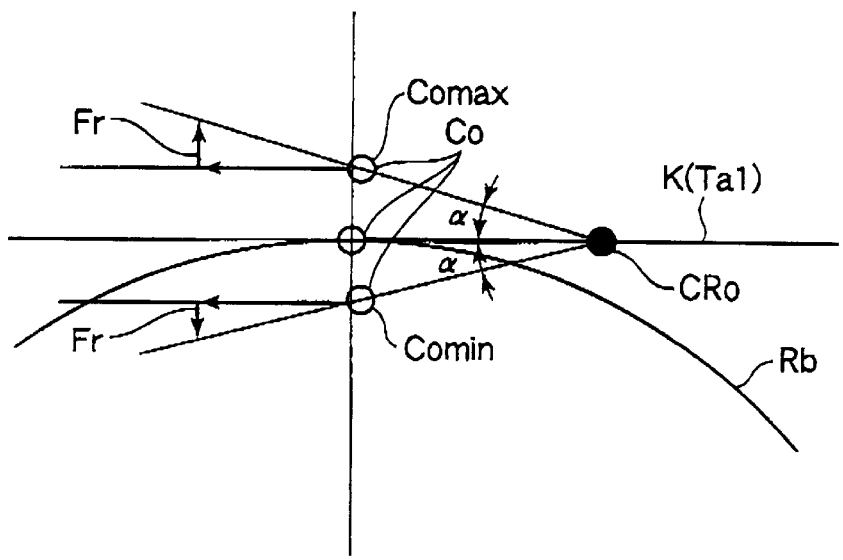
FIG. 13 is a diagram illustrating a basic setting arrangement of the axis center of a carrier pin according to the present invention.

In contrast to this, in FIG. 13, the axis center CRo of the carrier pin 30 is placed on the outside of the reference circle Rb. More specifically, assume that the design axis center Co of the crank portion 32 (corresponding to the middle point of its machining tolerance) is placed on the outside of the reference circle Rb. Based on this assumption, the axis center CRo of the carrier pin 30 is placed on a tangent Ta1 at the axis center Co on the reference circle Rb. Suppose that the planet gear 14 has been successfully formed in a dimension corresponding to the middle point of its machining tolerance. In this case, as obviously seen from FIG. 13, the eccentric reference direction K of the crank portion 32 is aligned with the tangential direction Ta, thereby producing no moment in the radial direction. Furthermore, even when the planet gear 14 has been formed in a dimension apart from the middle point of its machining tolerance, the crank portion 32 is allowed to move symmetrically with respect to the eccentric reference direction K (=Ta) from Comin to Comax in the radial direction. This makes it possible to minimize a moment produced even when the crank portion 32 is biased onto either side.

Therefore, the setting arrangement of FIG. 13 can be called the basic form. This setting arrangement is especially effective when the present invention is applied to a type of the speed reducer for which the sun gear is manufactured as designed and then incorporated therein as it is (without any selection).

More specifically, the reference circle Rb is the circumference of a circle that is located at the equal distances from the design pitch circle of the internal gear 16 and the design pitch circle of the sun gear 12.

Incidentally, suppose that machining tolerances δWi, δWs are set at the internal gear 16 and the sun gear 12, respectively. In this case, the internal gear 16 and the sun gear 12 employ, as their design pitch circles, the pitch circle having a dimension corresponding to the middle point of its variation width that is caused by the respective machining tolerances δWi, δWs (see a specific example described later). This makes it possible to permit the difference in machining tolerance among the gears.

Incidentally, as already described, the axis center Co of the crank portion 32 can be moved in the radial direction. Correspondingly, use is made of this function to bring the planet gear 14 as close to the internal gear 16 as possible to provide a large space in the central portion, into which the sun gear 12 is selectively incorporated, the space being large enough just to accommodate the sun gear 12 therein. However, in such a case as has been just described, suppose that the axis center CRo of the carrier pin 30 is placed on the basic position as shown in FIG. 13, that is, outside the reference circle Rb and on the tangent Ta1 at the axis center Co of the reference circle. It was additionally found that this might practically result in an arrangement just like the one shown in FIG. 12.

In this context, provided is the following setting example that allows the present invention to be applied in a more rational manner to a speed reducer into which a sun gear is selectively incorporated.

This setting example is adapted to take the machining tolerance of each individual gear into consideration and provide the planet gears with their fundamental design backlash in the form of their machining tolerance.

[Precondition for Setting in This Embodiment]

(1) Let Zi be the number of teeth of the internal gear 16 and δWi its machining tolerance. In addition, let Zp be the number of teeth of the internal gear 14 and δWp its machining tolerance. On the other hand, let Zs be the number of teeth of the sun gear 12. However, there is not concept of machining tolerance for the sun gear 12 because a sun gear 12 having a proper dimension is incorporated after the assembly of the planet gear 14. Let An° be the pressure angle An° of each gear and m the module.

(2) S% of the engagement surface pressure of a gear (a tooth surface pressure) is assigned as a moment that is produced in the radial direction. The value of S% is preferably around 5% (of the order of 2 to 10%), however, may vary according to the specification of a speed reducer to be designed. At an increased assignment ratio, an increased amount of movement can be provided for the axis center Co of the crank portion 32 (or the planet gear 14) in the radial direction. However, as the ratio of occurrence of moment increases, efficiency or the stability of rotation (especially the rotational stability at high speeds) tends to decrease.

(3) To manufacture the planet gear, the fundamental design backlash is given as a fixed value in the form of a machining tolerance δBp. The fundamental backlash (or the machining tolerance) δBp is set mainly to permit the manufacturing error of the axis center CRo of the carrier pin 30 itself. This allows the design backlash to be initially given in the form of the machining tolerance δBp in order to permit the case where each gear takes on the maximum value of the machining tolerances δWi, δWp and in addition to this, an error (wobbling) occurs at the position of the axis center CRo of the carrier pin 30. The wobbling of the axis center CRo occurs due to a combination of various factors, and therefore its range cannot be identified unlike the machining tolerance of a gear itself. However, since the fundamental backlash is given, the wobbling can be permitted even when the position of the axis center CRo is wobbled in any directions.

Furthermore, the fundamental backlash given in the form of a machining tolerance simplifies its calculation harmonized with the machining tolerance of the gear itself. However, having a different meaning from usual machining tolerances, the fundamental backlash given in the form of a machining tolerance is not something ranging from zero to δBp but referenced as the fixed value of δBp.

[Determination of Eccentric Angle α Corresponding to S% of Tooth Surface Pressure]

First, the difference δTf is determined between the tangential forces (forces in the tangential direction) Tf (100) and Tf (100-S), which correspond to 100% and (100-S)% of the tooth surface pressure.

Figure 14:
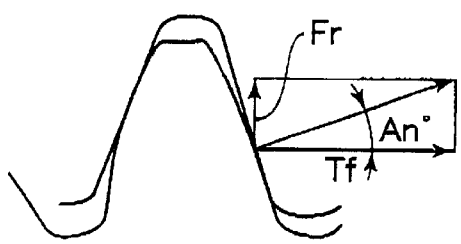
FIG. 14 is a partially enlarged schematic view illustrating an internal gear and a planet gear engaging with each other.

As shown in FIG. 14, with the pressure angle An°, the tangential force Tf multiplied by tan(An°) is equal to the moment Fr produced.

Figure 15:
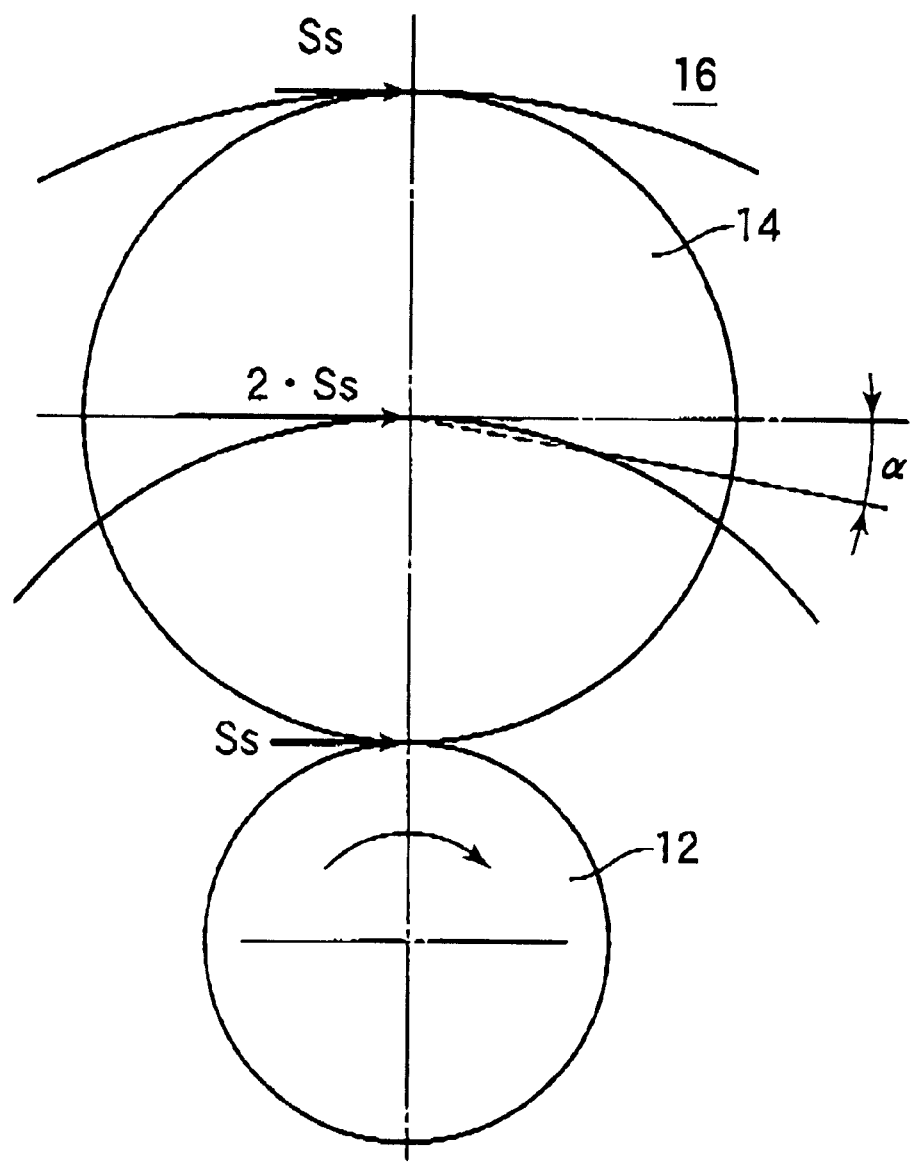
FIG. 15 is a schematic diagram illustrating a sun gear, a planet gear, and an internal gear to explain how to divide tangential forces.

On the other hand, it is known that the tangential force Tf is proportional to the square of the tooth surface pressure. Therefore, as shown in FIG. 15, consider the tangential forces Tf (100) and Tf (100-S) corresponding to each tooth surface pressure. Then, the tangential force Tf (100) given at 100% of the tooth surface pressure and tangential force Tf (100-S) given at (100-S)% of the surface pressure result in Equations (1) and (2), respectively, and the difference therebetween can be determined as ΔTf.

$$Tf(100) \div 1^2 = 1 \tag{1}$$

$$Tf(100-S) \div (1-S/100)^2 = Ss \tag{2}$$

$$\Delta Tf = Tf(100) - Tf(100-S) = 1 - Ss \tag{3}$$

On the other hand, the moment Fr produced, which is caused by the difference ΔTf between the tangential force Tf (100) and the Tf (100-S), results in Equation (4).

$$Fr = (1-Ss) \cdot \tan An° \tag{4}$$

Therefore, the maximum eccentric angle αmax, corresponding to the component force counterbalancing the moment Fr produced, can be written as in Equation (5).

$$\alpha max = \sin^{-1}\{Fr/(2 \cdot Ss)\} \tag{5}$$

[Backlash and the Amount of Movement of the Planet Gear]

Figure 16:
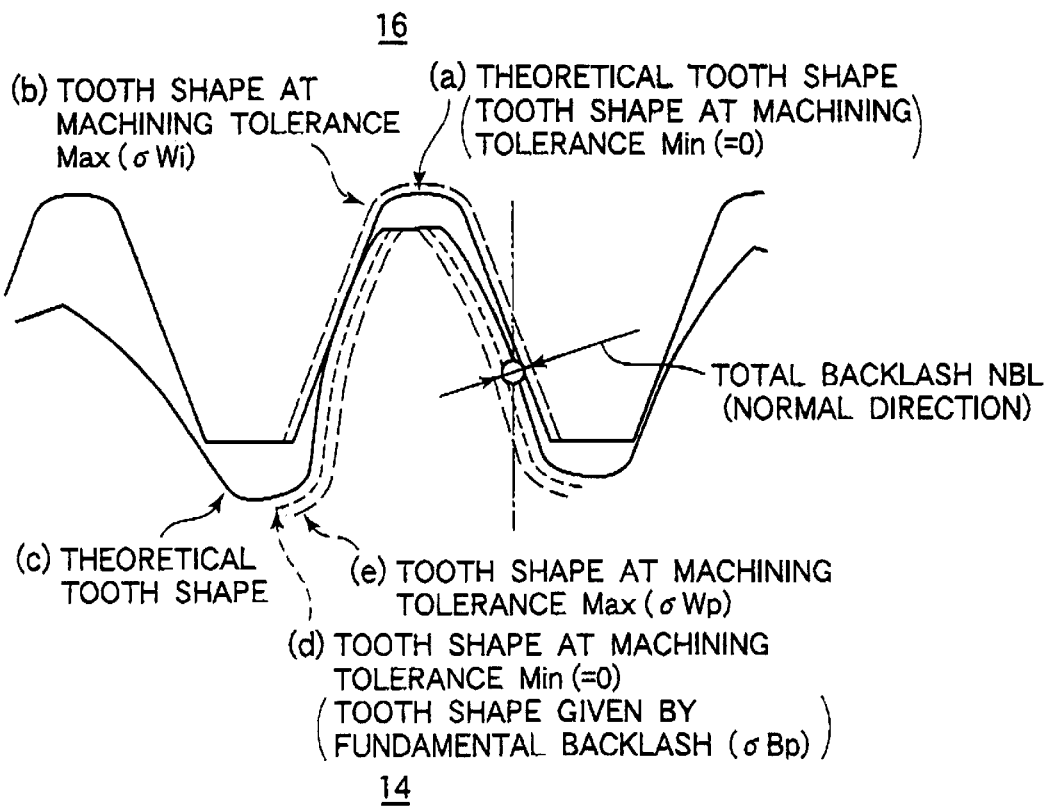
FIG. 16 is an axially sectional explanatory view illustrating the relationship between the machining tolerance and backlash upon forming the tooth shape of a gear with a rack.
Figure 17:
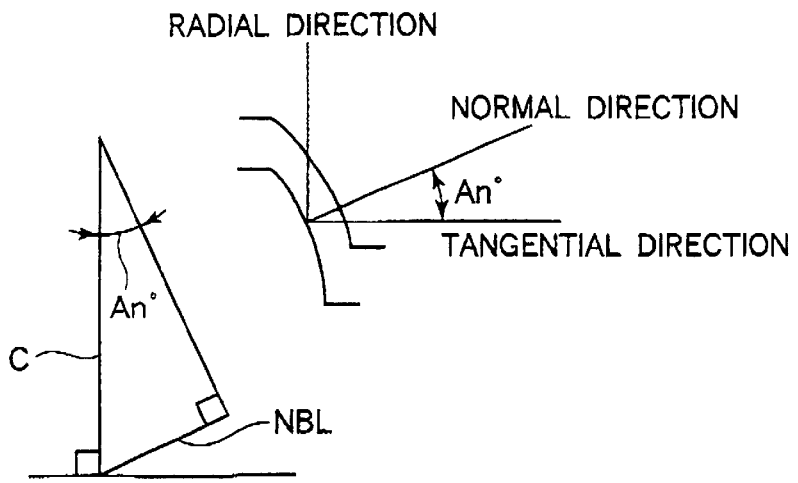
FIG. 17 is an explanatory schematic view illustrating the tangential, normal, and radial directions on a tooth surface.

(1) FIG. 16 shows the relationship between the fundamental backlash δBp and each of the machining tolerances δWi, δWp with the internal gear and the planet gear meshing with each other. In addition, FIG. 17 illustrates the conceptual aspect of this relationship.

Referring to FIG. 16, (a) shows the theoretical tooth shape of the internal gear 16, that is, the tooth shape manufactured with the machining tolerance zero, (b) shows the tooth shape manufactured with the machining tolerance of the internal gear 16 being at the maximum (δWi), and (c) shows the theoretical tooth shape of the planet gear (with the machining tolerance zero). Also referring to FIG. 16, (d) shows the tooth shape with the fundamental backlash given (fixedly) in the form of the machining tolerance δBp and manufactured with the machining tolerance of the planet gear 14 itself being zero. Further referring to FIG. 16, (e) shows the tooth shape manufactured with the machining tolerance of the planet gear 14 itself being at the maximum (δWp).

As can be seen clearly from these relationships, it is found that the total normal backlash NBL(μm) is δBp at its minimum and δBp+(δWi+δWp) at its maximum. That is, the total normal backlash NBL (if the wobbling of the axis center CRo is ignored) falls within this range even with the gear itself having any machining tolerance. Incidentally, the wobbling of the axis center CRo cannot be identified but is permitted due to the presence of the fundamental backlash δBp as described above.

Therefore, the movement C (mm) of the axis center Co of the crank portion 32 (or the planet gear 14) is reduced to Equation (6). By substituting the aforementioned total backlash NBLmin=δBp and NBLmax=δBp+(δWi+δWp) into Equation (6), the minimum Cmin and the maximum Cmax of the radial movement can be determined as in Equations (7) and (8).

$$C = NBL / \{(\sin An°) \cdot 2 \cdot 1000\} \quad (6)$$

$$Cmin = \delta Bp / \{(\sin An°) \cdot 2 \cdot 1000\} \quad (7)$$

$$Cmax = \{\delta Bp + (\delta Wi + \delta Wp)\} / \{(\sin An°) \cdot 2 \cdot 1000\} \quad (8)$$

Incidentally, in general, the machining tolerances δWi, δWp are determined for each of the gears 16, 14 in terms of a multiple of the gear tolerance unit w that is specified with the number of teeth Zi, Zp and the module m of the gears 16, 14 being employed as parameters.

More specifically, for example, the δWi, δWp, and δBp may be preferably set to the order of 5w (five times the gear tolerance unit w).

[Setting the Axis Center CRo of the Carrier Pin 30]

Suppose that the planet gear 14 has been moved towards the internal gear 16 in the radial direction as much as possible in the speed reducer that has been manufactured as described above. In this condition, the axis center CRo of the carrier pin 30 is set on a tangent Ta4 on a circle (or a fourth reference circle) Rb4 that includes the center Cc (the middle point of the machining tolerance) of the displacement range Rt (=Cmax−Cmin) over which the axis center Co of the crank portion 32 (or the planet gear 14) is displaced in the radial direction due to each of the machining tolerances δWi, δWp, and δBp.

Figure 18:
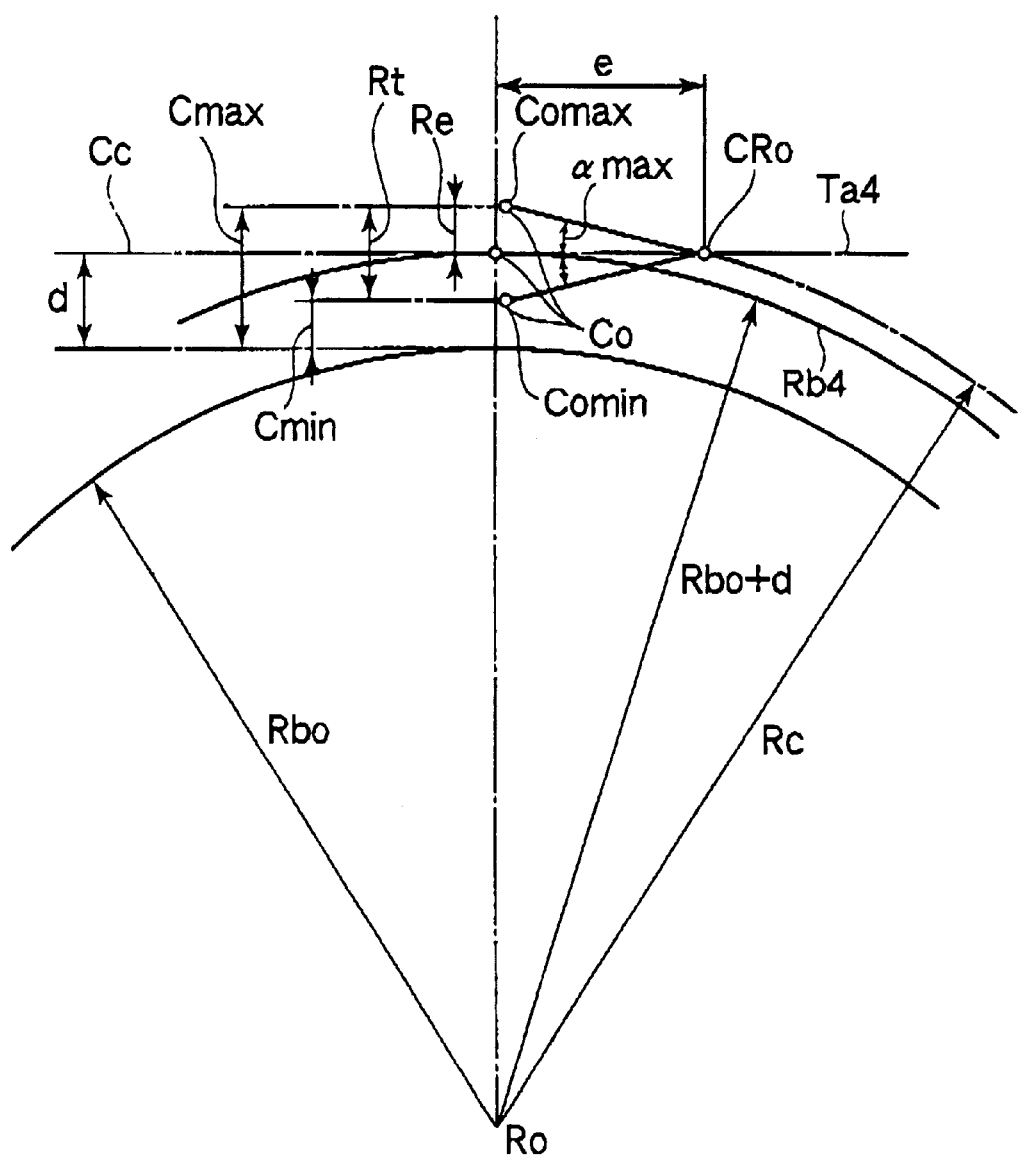
FIG. 18 is a diagram illustrating the relationship between the axis center of a carrier pin and the axis center of a crank portion (or a planet gear)

As can be seen clearly from FIG. 18, the fourth reference circle Rb4 is located outside the base circle Rb0, corresponding to a zero machining tolerance including the fundamental backlash, by d=(Cmax +Cmin)/2. Suppose that the axis center Co of the crank portion 32 (or the planet gear 14) is placed on the fourth reference circle Rb4. In this case, it can be said that the axis center CRo of the carrier pin 30 is set on the tangent Ta4 at the axis center Co of the crank portion 32 on the fourth reference circle Rb4. The one-side radial displacement range Re of the axis center Co of the crank portion 32 is equal to Rt/2=(Cmax−Cmin)/2.

[The Amount of Eccentricity e of the Crank Portion 32]

From the maximum eccentric angle αmax and the one-side radial displacement range Re, the amount of eccentricity e of the crank portion 32 is to be set to Re/sin (αmax°). In addition, the equidistant radius Rc of the carrier pin 30 from the axis center Ro of the speed reducer R1 is the square root of $\{(Rb0+d)^2 + e^2\}$.

In the speed reducer R1 that has been set and manufactured as described above, no radial moment is produced at the middle point of its machining tolerance. Even when the speed reducer R1 has been manufactured with its machining tolerance at zero or at its maximum, the radial moment can be reduced to S% of the tooth surface pressure or less.

Incidentally, in this embodiment, all the machining tolerances δWi, δWp of each gear and the machining tolerance δBp corresponding to the fundamental backlash have been taken into account at the same time. However, it is also possible to take only either one of the tolerances in the same manner.

Suppose that only the machining tolerances δWi, δWp of each gear are taken into account. In this case, only the machining tolerances δWi, δWp may be set in the aforementioned explanation, while the machining tolerance δBp corresponding to the fundamental backlash is considered zero. By setting the machining tolerances δWi, δWp to a slightly larger value, it is correspondingly possible to absorb the wobbling of the axis center CRo of the carrier pin 30.

Incidentally, taking only the machining tolerance of the gear itself into account corresponds to the case where d=0, that is, Rb0=Rb4 in FIG. 18. In this condition, assume that a second reference circle (or Rb in FIG. 13) has a radius or a dimension corresponding to the middle point between the positions of the axis center of the crank portion, Comax and Comin. The position Comax corresponds to the case where the planet gear is brought towards the internal gear when both the internal gear and the planet gears have been manufactured at the maximum machining tolerances. The position Comin corresponds to the case where the planet gear is brought towards the internal gear when both the internal gear and the planet gears have been manufactured at zero machining tolerances. After all, as already described in FIG. 13, it follows that the axis center CRo of the carrier pin is to be set on the tangent Ta1 at the axis center Co of the crank portion on the second reference circle, assuming that the axis center Co of the crank portion is placed on the second reference circle.

On the other hand, consider the case where only the fundamental backlash is taken into account. In this case, the machining tolerance δBp corresponding to the fundamental backlash may be given as a slightly larger fixed value, and the machining tolerances δWi, δWp of each gear may be ignored (δWi=δWp=0).

Figure 19:
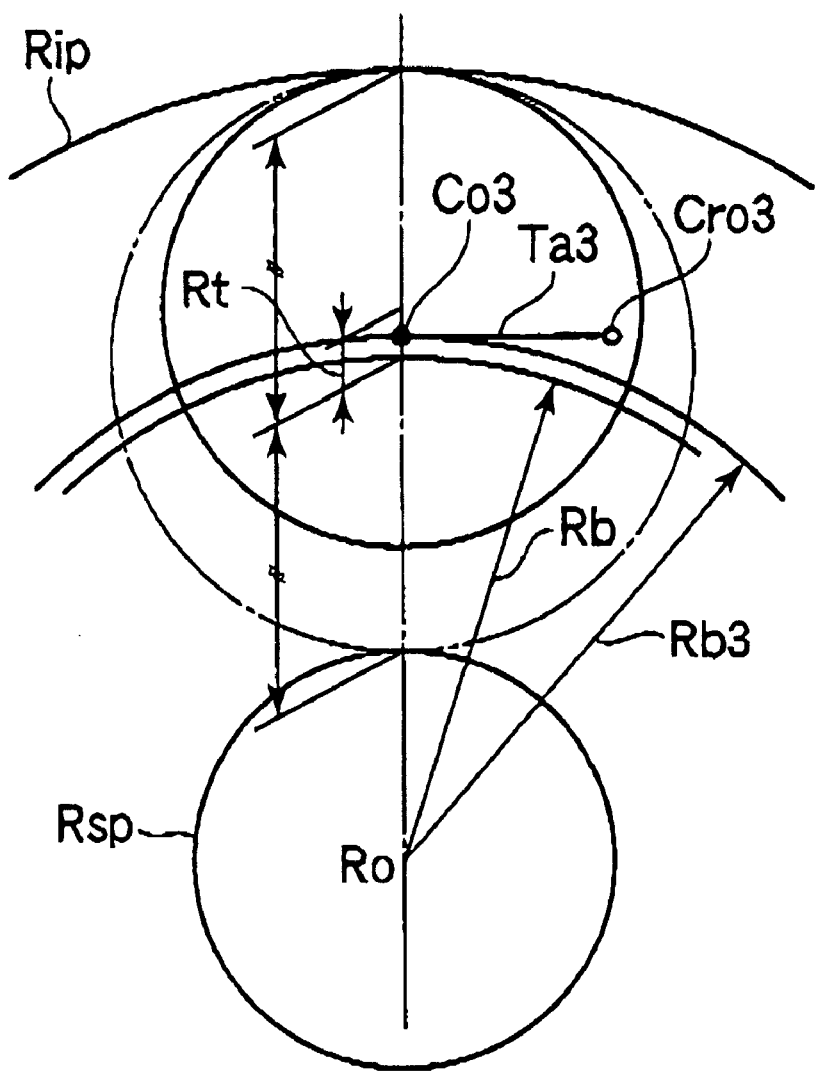
FIG. 19 is a diagram illustrating the relationship between the axis center of a carrier pin and the axis center of a crank portion (or a planet gear), provided when designed in consideration of only the fundamental backlash of a planet gear.

Consider the case where only the fundamental backlash with respect to the planet gear is taken into account. As shown in FIG. 19, assume that a third reference circle Rb3 has the radius or the dimension that is located outside the reference circle Rb by one-half the radial displacement range Rt of the axis center Co of the crank portion that corresponds to the fundamental backlash given to the planet gear. The reference circle Rb is equidistant from the design pitch circle Rip of the internal gear and the design pitch circle Rsp of the sun gear. In this case, after all, it follows that the axis center CRo3 of the carrier pin is to be set on the tangent Ta3 at the axis center Co of the crank portion on the third reference circle Rb3, assuming that the axis center Co of the crank portion is placed on the third reference circle Rb3.

In this case, it is difficult to identify the displacement range of the axis center Co3 of the crank portion 32. However, when each of the parts has been manufactured in the predetermined size, no radial moment will be produced. Thus, in practice, no particular problem may conceivably arise in most cases.

Although only a limited number of the embodiments of the present invention have been described, it should be understood that the present invention is not limited thereto, and various modifications and variations can be made without departing from the sprit and scope of the invention defined in the accompanying claims.

What is claimed is:

1. A support structure for a planet gear in a simple planetary gear mechanism comprising a sun gear, a planet gear, supported by a carrier pin supported by a carrier, circumscribing the sun gear, and an internal gear inscribed by the planet gear, wherein said carrier pin is provided with a crank portion having an eccentric direction, eccentric with respect to an axis center of said carrier pin, the eccentric direction being radially variable, and said planet gear is supported rotatably about an axis center of the crank portion, the axis center being radially variable.

2. The support structure for a planet gear in a simple planetary gear mechanism according to claim 1, wherein said carrier pin comprises an eccentric cam capable of rotatably supporting said planet gear, the eccentric cam being integrated with said carrier pin in a direction of rotation, and said carrier pin is rotatably supported by said carrier to thereby form the crank portion of said carrier pin.

3. The support structure for a planet gear in a simple planetary gear mechanism according to claim 1, wherein an eccentric cam capable of rotatably supporting said planet gear is rotatably incorporated onto an outer circumference of said carrier pin to thereby form the crank portion of said carrier pin.

4. The support structure for a planet gear in a simple planetary gear mechanism according to claim 1, comprising three of said planet gears.

5. The support structure for a planet gear in a simple planetary gear mechanism according to claim 1, wherein when an eccentric reference direction is defined as a reference direction of eccentricity of the axis center of the crank portion with respect to the axis center of the carrier pin, the eccentric reference direction of the crank portion of each of said carrier pins is directed towards the same side relative to a straight line connecting between the axis center of said simple planetary gear mechanism and the axis center of said carrier pin.

6. The support structure for a planet gear in a simple planetary gear mechanism according to claim 1, wherein when an eccentric reference direction is defined as a reference direction of eccentricity of the axis center of the crank portion with respect to the axis center of the carrier pin, an even number of said planet gears are provided, and one eccentric reference direction of the crank portion of adjacent carrier pins is alternately directed opposite to the other relative to the straight line connecting between the axis center of said simple planetary gear mechanism and the axis center of said carrier pin.

7. The support structure for a planet gear in a simple planetary gear mechanism according to claim 1, wherein the eccentric direction of the crank portion of said carrier pin can be fixed.

8. The support structure for a planet gear in a simple planetary gear mechanism according to claim 1, wherein said sun gear is incorporated in a floated condition.

9. A method for manufacturing a simple planetary gear mechanism comprising a sun gear, a planet gear, supported by a carrier pin supported by a carrier, circumscribing the sun gear, and an internal gear inscribed by the planet gear, including the steps of:

incorporating the internal gear, incorporating the planet gear so that an axis center of the planet gear is eccentric with respect to an axis center of said carrier pin, the axis center of the planet gear being radially variable with respect to said simple planetary gear mechanism, selectively extracting a sun gear having a proper dimension from a plurality of sun gears having different dimensions, and incorporating the extracted sun gear into a central portion of said already incorporated planet gears while the eccentric situation of the axis center of the planet gear is being adjusted.

10. The support structure for a planet gear in a simple planetary gear mechanism according to claim 1, wherein the axis center of said carrier pin is set outside a reference circle located equidistant from a design pitch circle of said internal gear and a design pitch circle of the sun gear.

11. The support structure for a planet gear in a simple planetary gear mechanism according to claim 10, wherein when said internal gear and said sun gear are provided with respective machining tolerances, a pitch circle having a dimension corresponding to a middle point of a displacement range of a pitch circle varied due to the machining tolerance of the respective gears is used as respective design pitch circles of said internal gear and said sun gear.

12. The support structure for a planet gear in a simple planetary gear mechanism according to claim 10, wherein when it is assumed that the axis center of said crank portion is placed on said reference circle, the axis center of said carrier pin is set on a tangent at the axis center of said crank portion on said reference circle.

13. The support structure for a planet gear in a simple planetary gear mechanism according to claim 10, wherein when, as said sun gear, a sun gear having the most suitable dimension is selectively incorporated, said internal gear and said sun gear are provided with respective machining tolerances, and a circle having a radius or a dimension corresponding to the middle point between one and the other position of the axis center of the crank portion is employed as a second reference circle, the one position corresponding to a case where said planet gear is brought towards said internal gear when both said internal gear and said planet gear have been manufactured at their respective maximum machining tolerances, the other position corresponding to a case where said planet gear is brought towards said internal gear when both said internal gear and said planet gears have been manufactured at zero machining tolerances, the axis center of said carrier pin is set on a tangent at the axis center of the crank portion on said second reference circle, assuming that the axis center of the crank portion is placed on said second reference circle.

14. The support structure for a planet gear in a simple planetary gear mechanism according to claim 10, wherein when, as said sun gear, a sun gear having the most suitable dimension is selectively incorporated, fundamental backlash is given in advance in the form of a predetermined machining tolerance upon manufacturing said planet gear, and a circle is employed as a third reference circle, the circle having, as its radius, a dimension being outside a reference circle by one-half the radial displacement range of the axis center of the crank portion corresponding to the fundamental backlash given to said planet gear, the reference circle being equidistant from the design pitch circle of said internal gear and the design pitch circle of said sun gear, the axis center of said carrier pin is set on a tangent at the axis center of said crank portion on said third reference circle, assuming that the axis center of said crank portion is placed on said third reference circle.

15. The support structure for a planet gear in a simple planetary gear mechanism according to claim 10, wherein when, as said sun gear, a sun gear having the most suitable dimension is selectively incorporated, said internal gear and said sun gear are provided with respective machining tolerances, and fundamental backlash is given in advance in the form of a predetermined machining tolerance upon manufacturing said planet gear, and a circle having a radius or a dimension corresponding to the middle point between one and the other position of the axis center of the crank portion is employed as a fourth reference circle, the one position corresponding to a case where said planet gear is brought towards said internal gear when both said internal gear and said planet gear have been manufactured at their respective maximum machining tolerances in the presence of a machining tolerance corresponding to the backlash given to said planet gear, the other position corresponding to a case where said planet gear is brought towards said internal gear when both said internal gear and said planet gears have been manufactured at zero machining tolerances in the presence of a machining tolerance corresponding to the backlash, the axis center of said carrier pin is set on a tangent at the axis center of said crank portion on said fourth reference circle, assuming that the axis center of said crank portion is placed on said fourth reference circle.

16. A support structure for a planet gear in a simple planetary gear mechanism, comprising a sun gear, a planet gear, circumscribing the sun gear, an internal gear inscribed by the planet gear, and a carrier pin supporting the planet gear and synchronizing with the planet gear's orbital motion, wherein said planet gear is assembled so that an axis center of the planet gear is eccentric with respect to an axis center of said carrier pin, said planet gear being radially variable with respect to said simple planetary gear mechanism.

* * * * *